US012620687B2

(12) United States Patent
Takeuchi et al.

(10) Patent No.: US 12,620,687 B2
(45) Date of Patent: May 5, 2026

(54) VEHICLE-TYPE ANTENNA

(71) Applicant: AGC Inc., Tokyo (JP)

(72) Inventors: Shoichi Takeuchi, Tokyo (JP); Hideaki Shoji, Tokyo (JP); Toshiki Sayama, Tokyo (JP); Yusuke Kato, Tokyo (JP)

(73) Assignee: AGC INC., Tokyo (JP)

( * ) Notice: Subject to any disclaimer, the term of this patent is extended or adjusted under 35 U.S.C. 154(b) by 61 days.

(21) Appl. No.: 18/883,653

(22) Filed: Sep. 12, 2024

(65) Prior Publication Data

US 2025/0015476 A1 Jan. 9, 2025

Related U.S. Application Data

(63) Continuation of application No. PCT/JP2023/009347, filed on Mar. 10, 2023.

(30) Foreign Application Priority Data

Mar. 17, 2022 (JP) ................................ 2022-043209

(51) Int. Cl.
*H01Q 1/12* (2006.01)
*H01Q 1/48* (2006.01)
*H01Q 13/10* (2006.01)

(52) U.S. Cl.
CPC ............ *H01Q 1/1271* (2013.01); *H01Q 1/48* (2013.01); *H01Q 13/10* (2013.01)

(58) Field of Classification Search
None
See application file for complete search history.

(56) References Cited

U.S. PATENT DOCUMENTS 6,191,750 B1 * 2/2001 Bonebright .......... H01Q 13/085 343/700 MS
2014/0306854 A1 10/2014 Flores-Cuadras
(Continued)

FOREIGN PATENT DOCUMENTS

JP H10-308620 A 11/1998
JP 2000-196327 7/2000
JP 3098997 U 3/2004

OTHER PUBLICATIONS

International Searching Authority, "International Search Report," issued in connection with International Patent Application No. PCT/JP2023/009347, dated May 23, 2023.
(Continued)

*Primary Examiner* — Crystal L Hammond
(74) *Attorney, Agent, or Firm* — Foley & Lardner LLP

(57) ABSTRACT

A vehicle-type-antenna-device includes: a dielectric plate for a vehicle; and an antenna attached to the dielectric-plate; wherein the antenna includes: a dielectric-layer disposed along a curved-surface of the dielectric-plate, a conductive-layer laminated on the dielectric-layer and having a planar-pattern formed thereon, a feeding portion electrically connected to the planar-pattern, and an electronic-component electrically connected to the conductive-layer and having a higher rigidity than a combined rigidity of the dielectric-layer and the conductive-layer, wherein a curved-region of the dielectric-plate is defined as an extent to which the dielectric-layer-is attached to the curved-surface includes a first-curved line having a smallest radius-of-curvature in the curved-region and a second-curved line intersecting the first-curved line and having a radius-of-curvature larger than that of the first-curved line, and a longitudinal direction of an extent of the dielectric-plate to which the electronic-
(Continued)

component is disposed is a direction along the second-curved line, the extent being a range.

20 Claims, 16 Drawing Sheets

(56) References Cited

U.S. PATENT DOCUMENTS

| | | | |
|---|---|---|---|
| 2019/0165447 | A1 | 5/2019 | Furlan |
| 2020/0176859 | A1 | 6/2020 | Furlan |

OTHER PUBLICATIONS

International Searching Authority, "Written Opinion," issued in connection with International Patent Application No. PCT/JP2023/009347, dated May 23, 2023.

* cited by examiner

VEHICLE-TYPE ANTENNA

CROSS-REFERENCE TO RELATED APPLICATION

The present application is a continuation application of International Application No. PCT/JP2023/009347, filed Mar. 10, 2023, which claims priority to Japanese Patent Application No. 2022-043209 filed Mar. 17, 2022. The contents of these applications are incorporated herein by reference in their entirety.

BACKGROUND OF THE INVENTION

1. Field of the Invention

The present disclosure relates to an vehicle-type antenna.

2. Description of the Related Art

Conventional, a sheet-type antenna having an antenna element affixed to the surface of a sheet in an appropriate meandering pattern is known as an antenna affixed to a glass surface of a vehicle (See Patent Document 1, for example).

In the case where a sheet-type antenna is affixed to the main surface of vehicle-type window glass, if a chip-shaped electronic component having high rigidity is attached to the sheet, there is a possibility that excess stress will get generated in a portion along the curved surface of the window glass. When such stress is generated, there is a possibility that the stability in the attachment of the antenna to the curved face of the window glass will deteriorate or the antenna characteristics will deteriorate.

There may be a need to provide a vehicle-type antenna device in which an antenna, on which an electronic component is mounted, is stably attached along the curved surface of a dielectric plate, such as window glass.

RELATED-ART DOCUMENTS

Patent Documents

Patent Document 1: Japanese Utility Model Registration Publication No. 3098997

SUMMARY OF THE INVENTION

A vehicle-type antenna device includes:
a dielectric plate for a vehicle; and
an antenna attached to the dielectric plate;
wherein the antenna includes:
- a dielectric layer disposed along a curved surface of the dielectric plate,
- a conductive layer laminated on the dielectric layer and having a planar pattern formed thereon,
- a feeding portion electrically connected to the planar pattern, and
- an electronic component electrically connected to the conductive layer and having a higher rigidity than a combined rigidity of the dielectric layer and the conductive layer, wherein a curved region of the dielectric plate is defined as an extent to which the dielectric layer is attached to the curved surface includes a first curved line having a smallest radius of curvature in the curved region and a second curved line intersecting the first curved line and having a radius of curvature larger than that of the first curved line, and a longitudinal direction of an extent of the dielectric plate to which the electronic component is disposed is a direction along the second curved line, the extent being a range.

According to at least one embodiment of the present disclosure, the vehicle-type antenna in which an antenna, on which an electric component is mounted, is stably attached along the curved surface of the dielectric plate, such as window glass.

DESCRIPTION OF THE PREFERRED EMBODIMENTS

Figure 1:
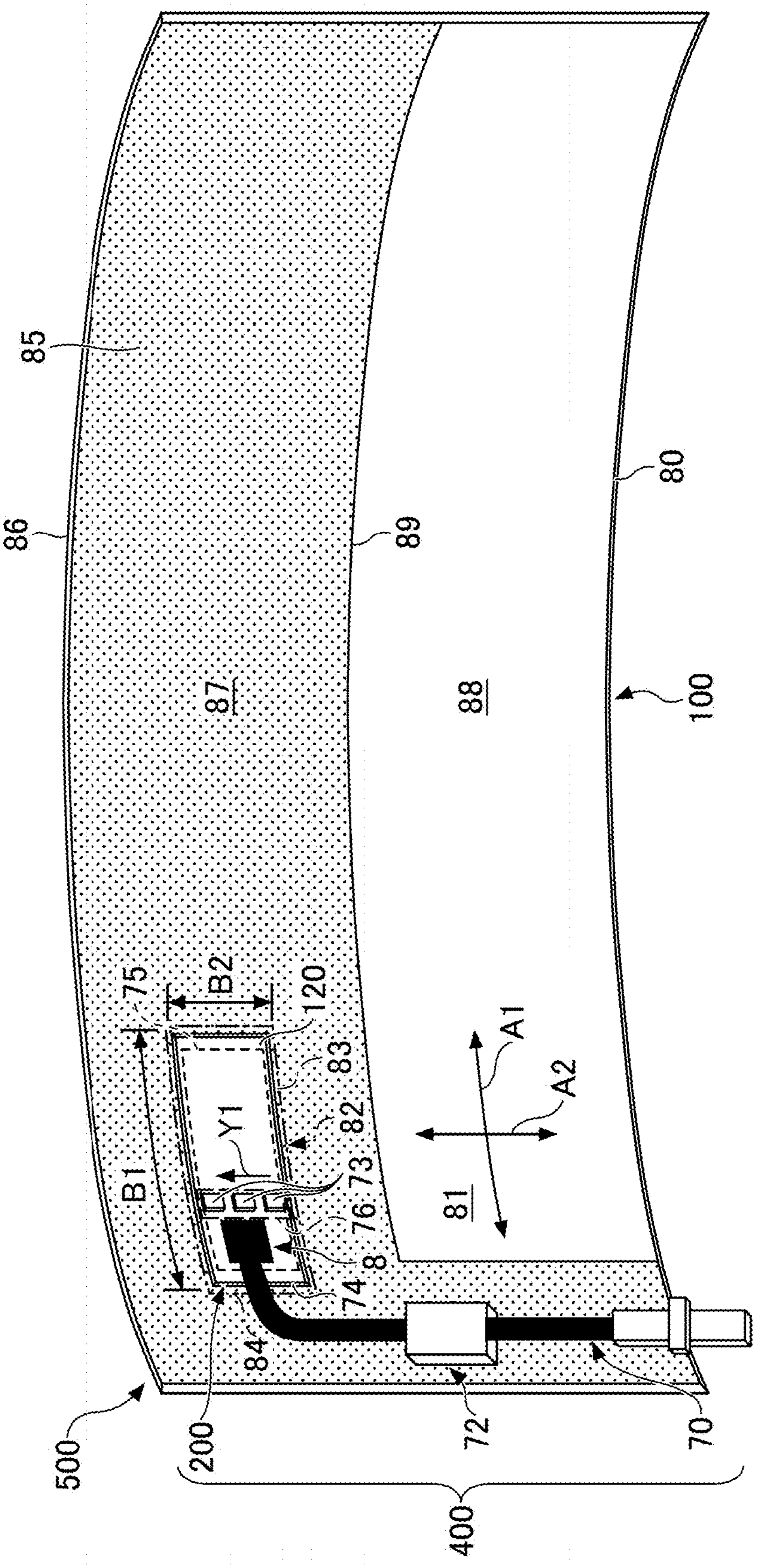
FIG. 1 is a diagram illustrating an example of a vehicle-type antenna device according to a first embodiment.

Embodiments are described below with reference to the drawings. For ease of understanding, the scale of each part in the drawings may differ from the actual one. Direction-based terms such as parallel, right angle, orthogonal, horizontal, vertical, vertical, right and left, up and down, and the like, and terms such as identical, equal, and the like are allowed to deviate to the extent that the effects of the embodiment are not impaired. Also, in this specification, the numerical range expressed using "to" encompasses, unless otherwise stated, the numerical values listed before and after "to" as lower and upper limits.

Examples of vehicle-type window glass in the embodiments include rear glass that is to be mounted on the rear of a vehicle, a windshield that is to be mounted on the front of a vehicle, side glass that is to be mounted on the side of a vehicle, and roof glass that is to be mounted on the ceiling of a vehicle. The vehicle-type glass is not limited to these examples. For example, window glass in which the roof glass is integrated with either or both of of the windshield and the rear glass may be used.

First Embodiment

FIG. 1 is a diagram illustrating an example of a vehicle-type antenna device according to the first embodiment. An antenna device 500 illustrated in FIG. 1 is an example of a vehicle-type antenna device and includes window glass 100 and an antenna 200. FIG. 1 illustrates a peripheral region of part of an outer peripheral edge 86 of the window glass 100. The antenna 200 is a planar low-profile antenna attached to part (in this example, a region near a corner of the window glass 100) of a main surface 81 of the window glass 100.

The window glass 100 is an example of vehicle-type window glass and, in this example, includes a glass plate 80 on which a light-shielding layer 85 is formed.

The glass plate 80 is vehicle-ty-e glass plate having an outer peripheral edge 86. The glass plate 80 may be a single glass plate or laminated glass in which multiple glass plates are laminated together. The glass plate 80 has a curved main surface 81 (curved surface).

The glass plate 80 is an example of a dielectric plate for a vehicle. However, the dielectric plate for the vehicle is not limited to a glass plate as long as the dielectric plate for the vehicle is a plate-shaped member having a dielectric as the main component. The dielectric may be glass or resin. Examples of the dielectric plate other than the glass plate include a resin plate. The use of the dielectric plate is not limited to a window plate, and may be another vehicle-type members such as a door, a spoiler, a bumper, or the like.

The light-shielding layer 85 is a layer that blocks visible light. The light-shielding layer 85 is formed on the glass plate 80, for example, on the main surface 81 of the glass plate 80. In the case where the glass plate 80 is laminated glass, the light-shielding layer 85 may be formed on the inner main surface of the multiple glass plates included in the laminated glass.

The light-shielding layer 85 is, for example, an opaque colored ceramic layer having a thickness of approximately 5 μm to 25 μm. Any color may be used for the light-shielding layer 85, but a dark color, such as black, brown, gray, dark blue, or the like, or white is preferred but black is more preferred. When at least part of the antenna 200 overlaps with the light-shielding layer 85 and the glass plate 80 in plan view, the portion overlapping with the light-shielding layer 85 is unlikely to be noticeable, and thus the aesthetic appearance of the window glass 100 on which the antenna 200 is mounted is improved. In the example illustrated in FIG. 1, a dielectric layer 120 described further below and a curved region 82 described further below overlap in plan view with the light-shielding layer 85 and the glass plate 80.

The light-shielding layer 85 is, for example, a strip region formed along the outer peripheral edge 86. In this case, an inner edge of the light-shielding layer 85 corresponds to an outer edge of the opening (transmittance region 88) of the window glass 100. In plan view of the glass plate 80, a region having the light-shielding layer 85 is referred to as a light-shielding region 87, and a region having no light-shielding layer 85 is referred to as a transmittance region 88. The light-shielding region 87 is a region where visible light is blocked by the light-shielding layer 85, and the transmittance region 88 is a region where visible light is blocked by the light-shielding layer 85.

The light-shielding layer 85 may include a boundary region where multiple dots are arranged. The boundary region where multiple dots are arranged is a region along the inner edge of the light-shielding layer 85 (a boundary 89 between the light-shielding region 87 and the transmittance region 88), and is a gradation region where the degree of light-shielding gradually changes.

The antenna 200 is a vehicle-type antenna attached to the main surface 81 of the glass plate 80. The antenna 200 has a dielectric layer 120, a conductive layer 74, a feeding portion 8, and an electronic component 73.

The dielectric layer 120 is a layer arranged along the curved main surface 81 of the glass plate 80. The dielectric layer 120, as illustrated, is disposed over the curved region 82, which is a region on part of the curved main surface 81. The dielectric layer 120 may contact the curved region 82, or another layer may exist between the dielectric layer 120 and the curved region 82. In this example, at least part of the conductive layer 74 exists between the dielectric layer 120 and the curved region 82. That is, the dielectric layer 120 may be a layer attached to the curved region 82 of the curved main surface 81 of the glass plate 80 with a predetermined layer provided therebetween.

The conductive layer 74 is a layer laminated on the dielectric layer 120 and has a planar pattern 75 formed thereon. The conductive layer 74 is not limited to a layer sandwiched between the dielectric layer 120 and the glass plate 80, and may be a layer disposed on the opposite side of the dielectric layer 120 from the glass plate 80.

The planar pattern 75 is a conductive pattern formed on the conductive layer 74. The planar pattern 75 may have any shape as long as it is formed so as to transmit or receive radio waves required for the antenna 200. The planar pattern 75 is formed, for example, to transmit or receive radio waves in at least a portion of a frequency band in the range of from 600 MHz to 6 GHz.

The feeding portion 8 is a portion electrically connected to the planar pattern 75. The electrical connection may include a connection via capacitive coupling. The feeding portion 8 is a portion that feeds power to the planar pattern 75. One end of a transmission line 70, such as a coaxial cable, is electrically connected to the feeding portion 8, for example. The other end of the transmission line 70 is connected to, for example, a device having either or both of a transmitting function and a receiving function.

The electronic component 73 is electrically connected to the conductive layer 74, and is an element having a higher rigidity than the combined rigidity of the dielectric layer 120 and the conductive layer 74. The electronic component 73 is, for example, a chip component configured to improve the antenna characteristics of the antenna 200. The electronic component 73 may be a component (for example, a resistor R and a resistor 96 described further below) for a device not illustrated connected to the other end of the transmission line 70 to detect whether the antenna 200 is connected or not. The electronic component 73 is mounted on the dielectric layer 120. When part or all of the conductive layer 74 exists between the electronic component 73 and the dielectric layer 120, part or all of the conductive layer 74 is placed on the dielectric layer 120, and the electronic component 73 is placed on part or all of the conductive layer 74.

The curved region 82 is defined as an extent to which the dielectric layer 120 is attached to the curved main surface 81 of the glass plate 80. The curved region 82 is, for example, a region of the main surface 81 of the glass plate 80 that overlaps with the dielectric layer 120 in plan view. The curved region 82 includes a first curved line 83 having the smallest curvature radius in the curved region 82, and a second curved line 84 intersecting the first curved line 83 and having a curvature radius larger than that of the first curved line 83. The first curved line 83 is an imaginary line curved in a first curvature direction A1 along the main surface 81. The second curved line 84 is an imaginary line curved in a second curvature direction A2 along the main surface 81.

In the example illustrated in FIG. 1, the curved region 82 is a substantially rectangular closed region defined by four sides, the first curved line 83 is a line extending along the longer side of the curved region 82, and the second curved line 84 is a line extending along the shorter side of the curved region 82. The first curved line 83 may be a line extending along the first outer edge (e.g., upper or lower edge) of the outer peripheral edge 86 of the glass plate 80. The second curved line 84 may be a line extending along the second outer edge (e.g., right or left edge) of the outer peripheral edge 86 of the glass plate 80. At least one of the first curved line 83 or the second curved line 84 may be a line extending in a direction different from the direction parallel to the sides defining the curved region 82. In plan view of the curved region 82, the second curved line 84 is not limited to a line orthogonal to the first curved line 83 and may be a line intersecting the first curved line 83 at an angle other than a right angle. In plan view of the curved region 82, the second curvature direction A2 is not limited to a direction orthogonal to the first curvature direction A1 and may be a direction intersecting the first curvature direction A1 at an angle other than a right angle.

A longitudinal direction Y1 of the range 76 in which the electronic component 73 is disposed (i.e., the range 76 being an extent of the dielectric plate to which the electronic component 73 is disposed) is a direction along the second curved line 84 (that is, the second curved line 84 is less curved than the first curved line 83.) whose radius of curvature is larger than that of the first curved line 83. Thus, by disposing the electronic component 73 so that the longitudinal direction Y1 of the range 76 is arranged along the second curved line 84, excess stress generated in a portion along the curved region 82 can be suppressed. The portion along the curved region 82 includes, for example, the electronic component 73, the feeding portion 8, the dielectric layer 120 and the conductive layer 74, and the surfaces thereof in contact with each other.

By suppressing such excess stress, the antenna 200 on which the electronic component 73 is mounted can be stably attached along the curved main surface 81 of the glass plate 80. Thus, the antenna device 500 on which the antenna 200 on which the electronic component 73 is mounted can be stably attached along the curved surface of the window glass 100. Further, by suppressing such excess stress, the stability in the electrical connection between the electronic component 73 and the conductive layer 74 is ensured, so that in the case where the electronic component 73 is a component configured to improve the antenna characteristics of the antenna 200, the antenna characteristics of the antenna 200 are stabilized. Thus, the antenna device 500 on which the antenna 200 on which the electronic component 73 is mounted can be stably mounted along the curved surface of the window glass 100, and thus the antenna characteristics of the antenna 200 are stabilized.

In terms of attaching the antenna 200 to the window glass 100 and retaining the antenna characteristics of the antenna 200, the second curved line 84 may be curved line having the largest radius of curvature in the curved region 82. That is, when the longitudinal direction Y1 is a direction along a curved line having the largest radius of curvature (the least curved) in the curved region 82, either or both of the stability in the attachment of the antenna 200 to the window glass 100 and the stability of the antenna characteristics of the antenna 200 are improved.

In the case where the electronic component 73 is one in number, the longitudinal direction Y1 of the range 76 corresponds to the longitudinal direction of the one electronic component 73. For example, when one electronic component 73 has a rectangular shape in plan view, the longitudinal direction Y1 corresponds to the direction along the long side of the one electronic component 73.

In the case where the electronic component 73 is two or more in number (i.e., two electronic or more of the electronic components 73), the longitudinal direction Y1 of the range 76 corresponds to the arrangement direction of the multiple electronic components 73 arranged in a straight line, for example. When the smallest rectangular region surrounding the multiple electronic components 73 is defined as the range 76, the longitudinal direction Y1 may be defined as the direction along the long side of the smallest rectangular region.

When the radius of curvature in the feeding portion 8 is larger than the radius of curvature in the range 76, stress generated in the feeding portion 8 can be excess suppressed even more. As a result, excess stress generated in the connecting portion between the feeding portion 8 and the end portion of the transmission line 70 or the connecting portion between the feeding portion 8 and the planar pattern 75 can be suppressed, so that either or both of stability of attachment of the antenna 200 onto the window glass 100 and stability in the antenna characteristics of the antenna 200 can be improved.

The curved region 82 is a closed region having a length B1 in the first curvature direction A1 along the first curved line 83 and a length B2 in the second curvature direction A2 along the second curved line 84. In the curved region 82, in the case where the length B1 has a dimension longer than the length B2, the dielectric layer 120 may be attached to the curved region 82 so that the longitudinal direction of the dielectric layer 120 is along the first curvature direction A1 with a sharp degree of curvature. In the example illustrated in FIG. 1, the longitudinal direction of the dielectric layer 120 is along the first curvature direction A1 in which the degree of curvature is sharp, while the longitudinal direction Y1 of the range 76 in which the electronic component 73 is disposed is along the second curvature direction A2 in which the degree of curvature is gentle. Thus, even in a configuration in which the dielectric layer 120 has a shape in which the first curvature direction A1 is the longitudinal direction, the stability in the attachment or stability in the antenna characteristics of the electronic component 73 is ensured.

In the example illustrated in FIG. 1, the curved region 82 is a substantially rectangular closed region having a length B1 in the first curvature direction A1 and a length B2 in the second curvature direction A2, but the curved region 82 may be a polygonal closed region other than a rectangle, or may be a closed region having an uneven or curved outer edge.

The radius of curvature of the first curved line 83 may be 1,500 mm or more, 2,000 mm or more, 2,500 mm or more, or 3,500 mm or more, for example. The upper limit of the radius of curvature of the first curved line 83 is not particularly limited as long as the dielectric layer 120 can be attached to the curved region 82.

The curved region 82 falls within a rectangular region having a short side having a length B2 of 50 mm or less in plan view of the glass plate 80, for example. If the length B2 of the short side is 50 mm or less, the area where the curved region 82 overlaps with the transparent region 88 can be narrowed or eliminated in a state where at least part of the curved region 82 overlaps with the light-shielding region 87. Thus, a range 76 in which the electronic component 73 is disposed so as to suppress excess stress generated in a portion along the curved region 82 can be ensured, and the aesthetic appearance of the window glass 100 to which the antenna 200 is attached can be ensured. The length B2 of the short side is preferably 40 mm or less, more preferably 35 mm or less, even more preferably 33 mm or less, and particularly preferably 31 mm or less. The lower limit value of the length B2 is not particularly limited as long as the region in which the electronic component 73 is disposed is ensured.

The antenna device 500 may be a device including an antenna module 400 including a transmission line 70 such as a coaxial cable. The antenna module 400 includes the antenna 200 and the transmission line 70. One end of the transmission line 70 may be electrically connected to the feeding portion 8 and may be fixed to the feeding portion 8, or may be detachably attached to the feeding portion 8 by a connector or the like.

In the example illustrated in FIG. 1, the dielectric layer 120 has a short side that intersects the transmission line 70 in plan view of the plat plate 80, and has a long side longer than the short side. Thus, one end of the transmission line 70 intersects a short side of the dielectric layer 120 and is electrically connected to the feeding portion 8.

Figure 2:
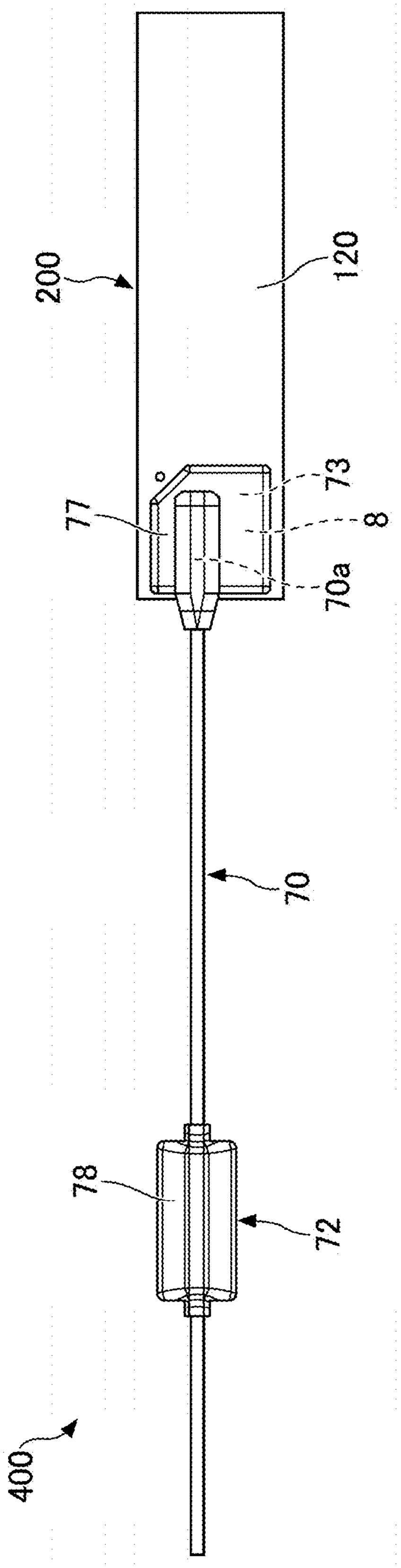
FIG. 2 is a diagram illustrating an example of an antenna module in plan view.

FIG. 2 is a diagram illustrating an example of an antenna module in plan view. In the antenna module 400 illustrated in FIG. 2, an end portion 70*a* of the transmission line 70, the feeding portion 8, and the electronic component 73 are coated and fixed by a hot-melt resin 77. As a result, since the coating and fixing of the end portion 70*a*, the feeding portion 8, and the electronic component 73 can be achieved at the same time, the attachment of the end portion 70*a*, the feeding portion 8, and the electronic component 73 is stabilized, the antenna characteristics of the antenna 200 are stabilized, or both are stabilized. In addition, the hot-melt resin 77 facilitates the sealing of the end portion 70*a*, the feeding portion 8, and the electronic component 73, and thus the attachment to the dielectric layer 120 strengthens. The hot-melt resin 77 is, for example, a thermoplastic resin such as polyimide or polyester resin, and is molded at a low pressure that does not damage the electronic component 73 to form the coating and attachment. The hot-melt resin 77 may include a hot-melt adhesive.

The dielectric layer 120 is a layer having a dielectric as the main component. The dielectric layer 120 may be a glass epoxy substrate such as FR4 or CEM3, or may be formed of a resin such as polyimide. The dielectric layer 120 may be formed of a fluororesin such as Polyethylene terephthalate (PET) or Polytetrafluoroethylene (PTFE), or a resin such as Liquid Crystal Polymer (LCP) or Polyphenylene oxide (PPO). By employing a thin glass epoxy substrate having a dielectric layer thickness of 0.07 mm to 1.47 mm (nominal thickness: 0.1 mm to 1.5 mm) for the dielectric layer 120, the conformability to the curved surface of the glass plate 80 is improved, and the mounting of the electronic component 73 and the formation of the conductive layer 74 are facilitated. In terms of improving the conformability to the curved surface of the glass plate 80, the thickness of the glass epoxy substrate is preferably 1.13 mm or less, more preferably 0.89 mm or less, even more preferably 0.58 mm or less, particularly preferably 0.35 mm or less, and most preferably 0.13 mm or less. Since the glass epoxy substrate has lower moisture absorption than a polyimide substrate known as a flexible substrate, the weather resistance of the antenna 200 against moisture or the like is improved.

The antenna module 400 may have a fixing part 72 for fixing the transmission line 70 to the glass plate 80. The fixing part 72 improves the stability of fixing the transmission line 70 to the glass plate 80 even in a case where the transmission line 70 is a coaxial cable or the like that is relatively long. The fixing part 72 is, for example, a portion in which the intermediate portion of f the transmission line 70 is coated and fixed with the hot-melt resin 78. This facilitates fixing the intermediate portion of the transmission line 70 to the glass plate 80.

Figure 3:
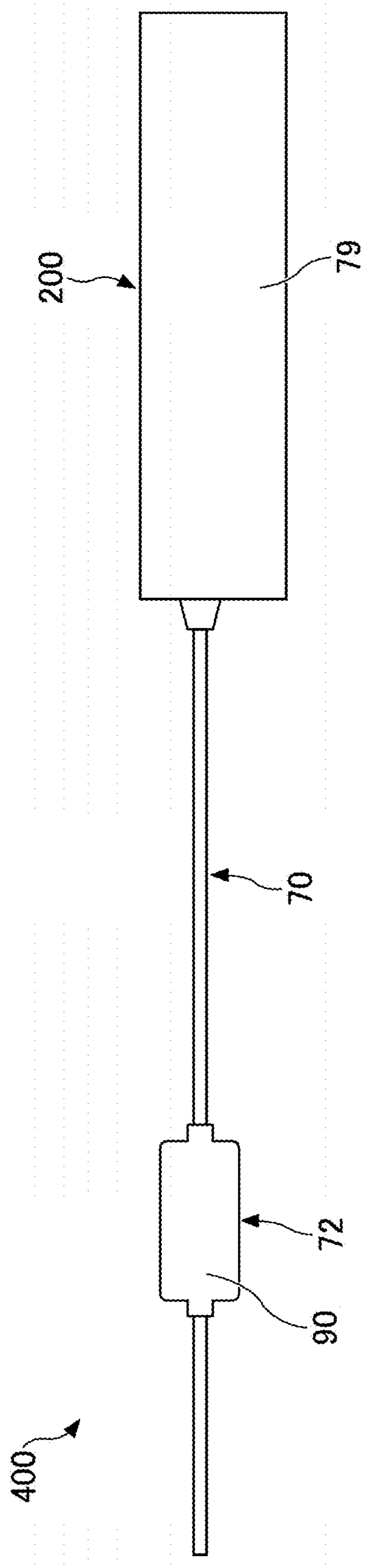
FIG. 3 is a view illustrating an example of an antenna module in a bottom view.

FIG. 3 is a diagram illustrating bottom view of an example of the antenna module. The antenna 200 may have an adhesive layer 79 that adheres to the glass plate 80, and may be fixed to the curved region 82 by the adhesive layer 79. This facilitates fixing of the antenna 200 to the glass plate 80. When the thickness of the adhesive layer 79 is 0.2 mm or more, the ability of the antenna 200 to conform to the curved surface of the glass plate 80 is improved. The thickness of the adhesive layer 79 may be 0.5 mm or more. Specific examples of the adhesive layer 79 include an adhesive, foam tape, double-sided tape, and the like. The adhesive layer 79 may be a dielectric layer having an adhesive surface such as double-sided tape formed on the surface thereof.

The fixing part 72 may have an adhesive layer 90 that adheres to the glass plate 80, and may be attached to the curved region 82 by the adhesive layer 90. This facilitates the attachment of the fixing part 72 to the glass plate 80. When the thickness of the adhesive layer 90 is 0.2 mm or more, the ability of the fixing part 72 to conform to the curved surface of the glass plate 80 is improved. Specific examples of the adhesive layer 90 include adhesive, foam tape, double-sided tape, and the like. The adhesive layer 90 may be a dielectric layer having an adhesive surface such as double-sided tape formed on the surface thereof.

The fixing part 72 may be any portion of the vehicle other than the glass plate 80, for example, a portion for fixing the transmission line 70 to the glass plate 80 by an attachment such as a bracket.

In the example illustrated in FIG. 1, the transmission line 70 is connected to the feeding portion 8 by being bent in a direction different from the direction in which the transmission line extends in the fixing part 72. Thus, in a state where the an intermediate portion of the transmission line 70 is stably fixed by the fixing part 72, the intermediate portion of the transmission line 70 can be extended in a direction different from the direction in which the transmission line 70 extends from the feeding portion 8.

Figure 4:
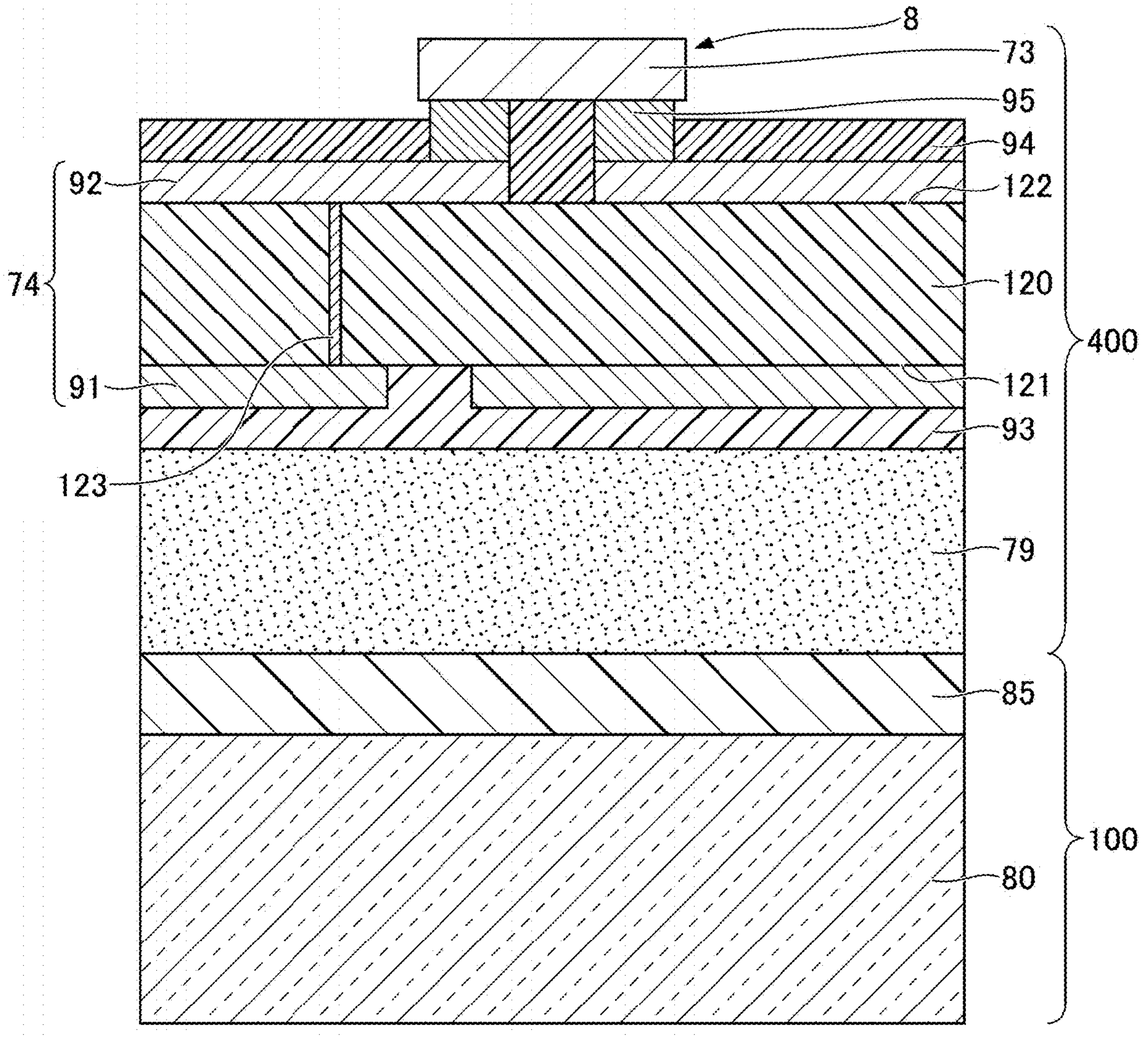
FIG. 4 is a cross-sectional view for describing an example of a laminated structure of the vehicle-type antenna device according to the first embodiment.

FIG. 4 is a cross-sectional view for describing an example of a laminated structure of the vehicle-type antenna device according to the first embodiment. The window glass 100 has the glass plate 80 on which the light-shielding layer 85 is formed. The dielectric layer 120 has a first main surface 121 facing the glass plate 80 and a second main surface 122 opposite to the first main surface 121. The dielectric layer 120 is, for example, a glass epoxy substrate. The conductive layer 74 includes a first conductive layer 91 provided on the first main surface 121 and a second conductive layer 92 provided on the second main surface 122. For example, the first conductive layer 91 is a flat-shaped conductor formed on the first main surface 121 by copper foil or the like, and the second conductive layer 92 is a flat-shaped conductor formed on the second main surface 122 by copper foil or the like. In order to ensure insulation between the first conductive layer 91 and other portions, the first conductive layer 91 may be covered with a resist 93, such as a solder resist. In order to ensure insulation between the second conductive layer 92 and other portions, the second conductive layer 92 may be covered with a resist 94 such as a solder resist.

The antenna 200 may have a connecting portion 123 for electrically connecting the first conductive layer 91 and the second conductive layer 92 in the thickness direction of the dielectric layer 120. This facilitates electrical connection between the first conductive layer 91 and the second conductive layer 92. The connecting portion 123 is, for example, a conductive portion passing through the dielectric layer 120, and specific examples thereof include through-holes, inlays, and the like.

The first conductive layer 91 is disposed on the side of the dielectric layer 120 where the glass plate 80 is provided. The planar pattern 75 (see FIG. 1) includes, for example, an element-shaped antenna, i.e., an antenna pattern, formed on the first conductive layer 91. The second conductive layer 92 is disposed on the opposite side of the dielectric layer 120 from the glass plate 80. The feeding portion 8 and the electronic component 73 are placed on the second conductive layer 92 and electrically connected to the second conductive layer 92 by solder 95 or the like.

By forming the antenna element pattern on the first conductive layer 91 facing the glass plate 80, an effect of wavelength shortening by the dielectric of the glass plate 80 can be expected, and thus the antenna element pattern can be miniaturized (i.e., made smaller). By placing the feeding portion 8 and the electronic component 73 on the second conductive layer 92, the feeding portion 8 and the electronic component 73, that are higher than the antenna element pattern, can be easily mounted on the antenna 200.

Figure 5:
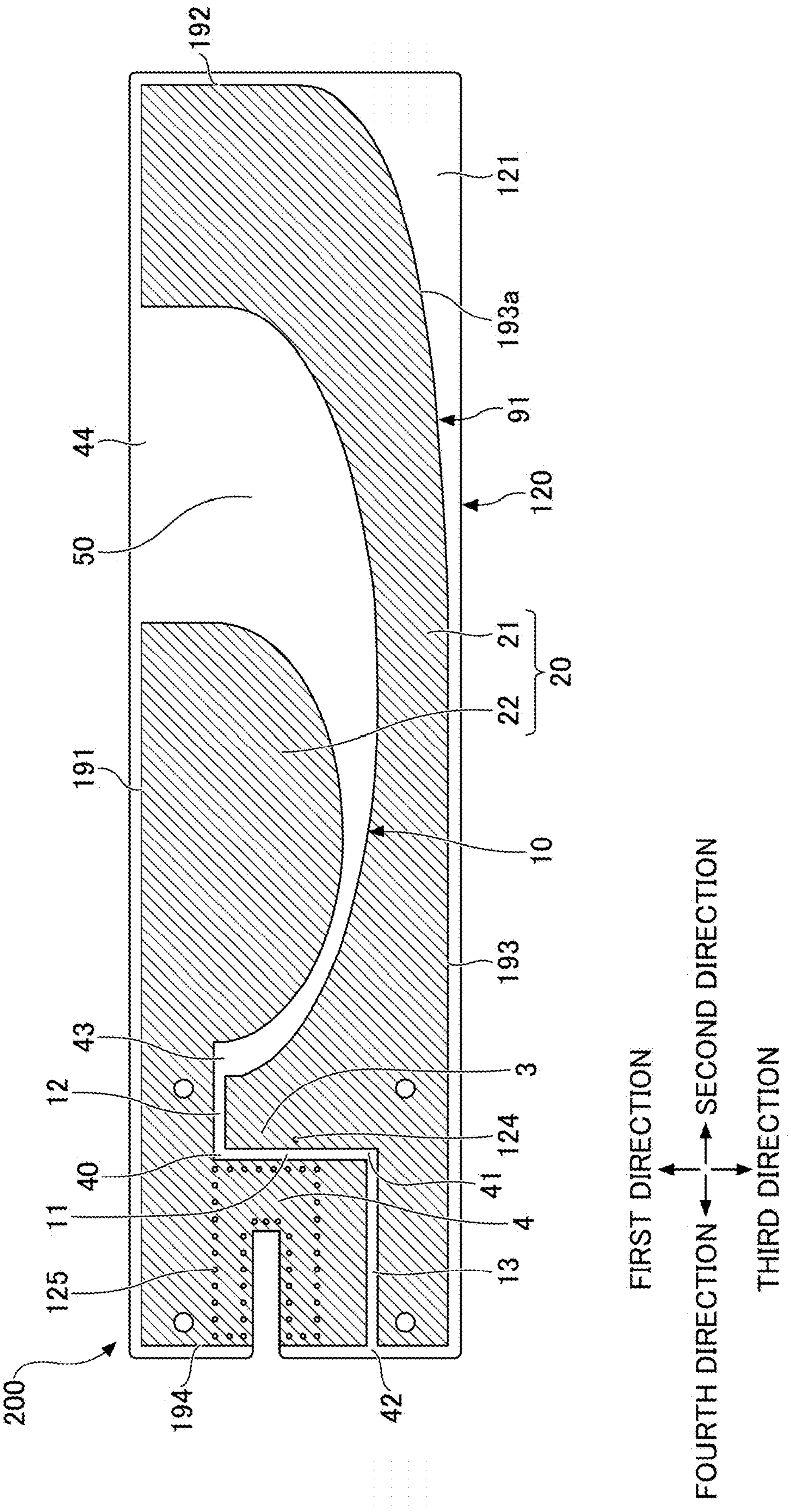
FIG. 5 illustrates an example of a planar pattern formed on a first conductive layer in plan view.

FIG. 5 is a diagram illustrating an example of a planar pattern formed on the first conductive layer in plan view. The first conductive layer 91 is provided on the first main surface 121 of the dielectric layer 120. An antenna element pattern 20 is a planar pattern formed on the first conductive layer 91.

The antenna 200 includes a flat antenna element pattern 20 in which a slot 10 is formed. The slot 10 is an elongated notch formed in the antenna element pattern 20.

The antenna element pattern 20 is an example of a flat conductor in the form of a film or a plate, and in this example, it is a conductive film (film having conductivity) in which the overall outer shape is formed into a substantially rectangular shape. In the first embodiment, the antenna element pattern 20 has a first direction-side outer edge 191, a second direction-side outer edge 192, a third direction-side outer edge 193, and a fourth direction-side outer edge 194.

The antenna element pattern 20 has a flat first antenna element pattern 21 extending to one side with respect to the slot 10 and has a flat second antenna element pattern 22 extending to the other side with respect to the slot 10. In this embodiment, the first antenna element pattern 21 and the second antenna element pattern 22 are separated by the slot 10. The antenna element pattern 20 including the first antenna element pattern 21 and the second antenna element pattern 22 faces the curved region 82 of the main surface 81 of the window glass 100 without there being an intervening dielectric layer 120.

Since the antenna element pattern 20 is provided on the dielectric layer 120, even in the case where the antenna element pattern 20 is divided into the first antenna element pattern 21 and the second antenna element pattern 22, a deviation in the dimensions of the slot 10 and the like is suppressed, and thus the antenna characteristics of the antenna 200 are stabilized. Moreover, this facilitates the attaching of the antenna 200 to the main surface 81 of the window glass 100.

The first antenna element pattern 21 has a first region 3 to which a signal line (not illustrated) is electrically connected, and the second antenna element pattern 22 has a second region 4 to which a ground line (not illustrated) is electrically connected. For example, an internal conductor (signal line) at one end of the coaxial cable is electrically connected to the first region 3, and an external conductor (ground line) at the one end of the coaxial cable is electrically connected to the second region 4. A device having either or both of a transmitting function and a receiving function, for example, is connected is connected to the other end of the coaxial cable. The area of the first antenna element pattern 21 is larger than that of the second antenna element pattern 22.

The slot 10 has a slot 11, a slot 12, a slot 13, and a J-shaped slot 50. The slot 13, the slot 11, the slot 12, and the J-shaped slot 50 are continuously connected in this connection order.

The first direction, the second direction, the third direction, and the fourth direction indicate the directions of the window glass 100 or the antenna 200 in plan view. The third direction indicates a direction opposite to the first direction, and the fourth direction indicates a direction opposite to the second direction. In the present embodiment, the adjacent directions among the first direction, the second direction, the third direction, and the fourth direction intersect at a right angle (including a substantially right angle). These descriptions are also incorporated in other plan views.

The slot 11 is an example of a first slot and extends in the first direction between the first region 3 and the second region 4.

The slot 12 is an example of a second slot and extends in the second direction different from the first direction from an end 40 of the slot 11 in the first direction.

The slot 13 is an example of a third slot. The slot 13 extends in the fourth direction from the end 41 and extends to the open end 42 in the fourth direction. The end 41 is an example of an end opposite to the first slot in the first direction. The open end 42 is an example of an open end that is opens in the fourth direction. The open end 42 opens at an outer edge 194 in the fourth direction.

The J-shaped slot 50 is an example of a J-shaped slot. The J-shaped slot 50 extends in a J-shape from an end 43 to an open end 44. The end 43 is an example of an end of second slot in the second direction. The open end 44 is an example of an open end that opens in the first direction. The open end 44 opens at the outer edge 191 in the first direction.

The slot width at the open end 44 of J-shaped slot 50 is larger than the slot width at the end 43 of the slot 12 in the second direction.

In a case where the vehicle body is made of metal, if the radiating element of the wire antenna made of silver paste is provided on the window glass at a position close to the vehicle body, the reception gain of the antenna tends to decrease due to interference with the metal.

However, since the antenna 200 according to the present embodiment is a slot antenna, the electric field generated by the electric current flowing through the antenna element pattern 20 is confined within the antenna element pattern 20, and therefore is unlikely to experience interference from the metal or resin.

Therefore, the antenna 200 according to the present embodiment can obtain stable characteristics even if metal such as a defogger capable of heating the window glass 100 or the vehicle body is close to the periphery of the antenna 200, or even if a resin portion of the vehicle body is close to the periphery of the antenna 200. Furthermore, even if a metal film, such as a transparent conductive film, is formed around the periphery of the antenna 200, the antenna 200 can obtain characteristics that likewise make interference unlikely.

The frequency used for communication waves varies from country to country, and even within a single country, different carriers use different frequency bands. Therefore, it is preferable to use an antenna that supports a wide band so as to be able to transmit and receive multiple communication waves.

The antenna 200 according to the first embodiment has multiple slots, such as the slot 11, the slot 12, the slot 13, and the J-shaped slot 50. The antenna 200 having multiple slots as described is impedance-matched so as to be suitable for transmitting and receiving radio waves in a relatively high frequency band, such as the Ultra High Frequency (UHF) band, and in the 600 MHz to 6 GHz frequency band (sub6) used in the fifth generation communication (5G) standard.

The antenna 200 may be impedance-matched so as to efficiently transmit and receive radio waves of Wi-Fi which is a wireless LAN (Local Area Network). The antenna 200 may be impedance-matched so as to transmit and receive radio waves in the frequency bands (863 MHz to 868 MHz (Europe), 902 MHz to 928 MHz (U.S.), 2,400 MHz to 2,497 MHz (common worldwide), 5,150 MHz to 5,350 MHz (common worldwide), 5,470 MHz to 5,850 MHz (common worldwide), and the like.) defined by the communication standards IEEE 802.11a, b, g, n, ac, ah, and ax.

The antenna 200 may be impedance-matched so as to transmit and receive radio waves of frequencies from 2,400 MHz to 2,483.5 MHz used in Bluetooth (registered trademark). The antenna 200 may be impedance-matched so as to transmit and receive radio waves in a frequency band (755.5 MHz to 764.5 MHz specified by ARIB STD-T109 (Japan), 5,850 MHz to 5,925 MHz specified by IEEE 802.11p, etc.) used in vehicle-to-infrastructure (V2I) or vehicle-to-vehicle (V2V) communication of Intelligent Transport Systems (ITS). The antenna 200 may be impedance-matched so as to transmit and receive radio waves in a frequency band (2,300 MHz to 2,400 MHz, 2,496 MHz to 2,690 MHz, 3,400 MHz to 3,600 MHz, etc.) used in WiMAX (registered trademark), which is another type of wireless communication technology. The antenna 200 may be impedance-matched so as to transmit and receive radio waves of a low-band (3,245 MHz to 4,742 MHz) of the ultra-wideband (UWB) wireless communication system.

As described above, according to the first embodiment, a wide-band flat-shaped antenna capable of supporting a relatively high frequency band up to approximately 6 GHz can be obtained, and vehicle-type window glass equipped with the planar antenna can be obtained.

The J-shaped slot 50 has a curved contour. The curved contour of J-shaped slot 50 enables the antenna 200 to operate (i.e., transmit and receive) over a broader frequency band.

The J-shaped slot 50 may have section where the slot width gradually increases. Therefore, the antenna 200 can operate (i.e., transmit and receive) over a broader frequency band. As illustrated in FIG. 5, the J-shaped slot 50 may have a section that extends from the end 43 of the slot 12 in the second direction with the slot width gradually increasing, and then extends in the first direction with the substantially same slot width.

The J-shaped slot 50 may have a contour that is half of an ellipse with a long axis substantially parallel to the second direction. In doing so, the contour of the J-shaped slot 50 is a smooth curve, and thus the antenna 200 can operate (i.e., transmit and receive) over a broad frequency range. The antenna 200 illustrated in FIG. 5 is an example in which the slot width gradually increases until the direction in which the J-shaped slot 50 extends is directed in the first direction, and the slot width becomes substantially the same at a portion extending parallel to the first direction.

The outer edge 193 opposite to the outer edge 191 includes a curved section 193*a*. The outer edge 193 including the curved section 193*a* facilitates impedance matching in a frequency band from 750 MHz to 1 GHz. In this embodiment, the curved section 193*a*, which is an end portion of the outer edge 193, has a contour of ¼ of an ellipse having a major axis substantially parallel to the second direction, but may have other curved contours such as a contour of ¼ or less of a circle or ellipse.

The first antenna element pattern 21 and the second antenna element pattern 22 may include a grid-shaped pattern having a hollowed section (not illustrated) in which a section of the antenna element pattern 20 is hollowed out. The hollowed section may be formed in at least one of the first antenna element pattern 21 or the second antenna element pattern 22.

Figure 6:
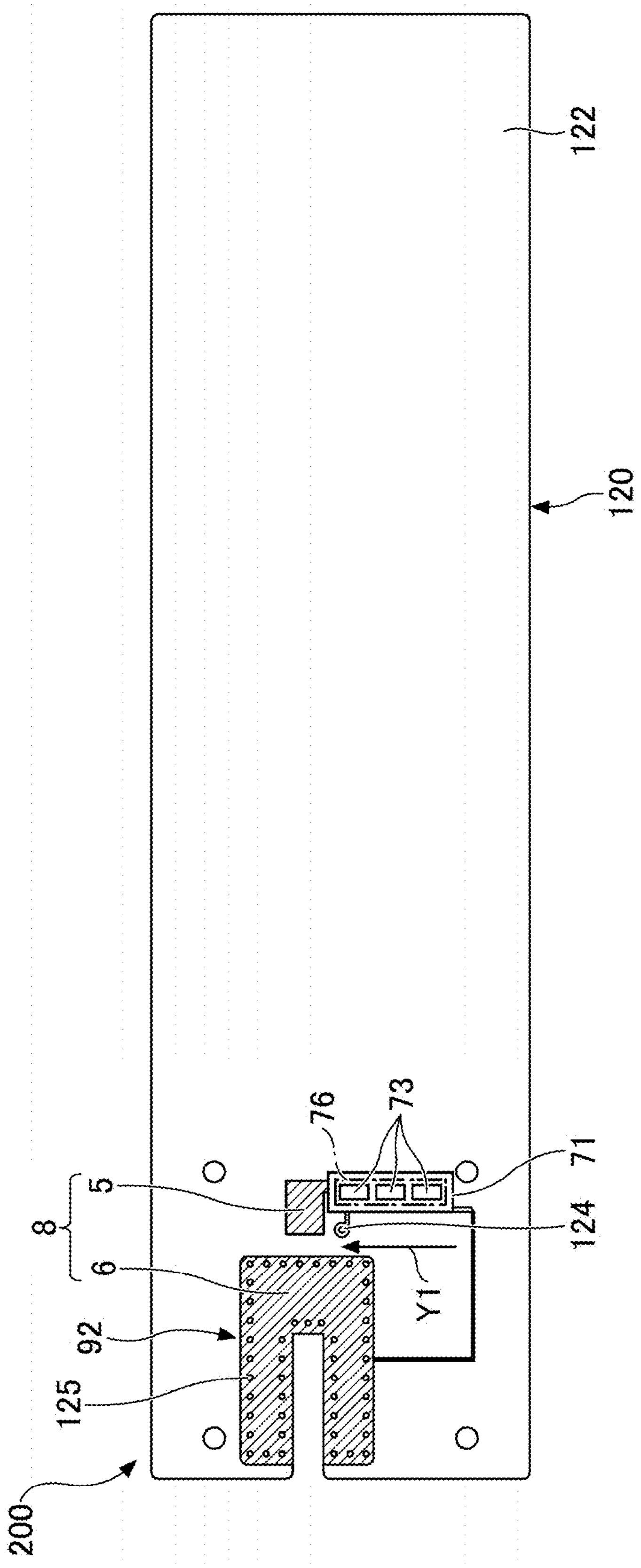
FIG. 6 illustrates an example of a planar pattern formed on the second conductive layer in plan view.

FIG. 6 is a diagram illustrating an example of a planar pattern formed on the second conductive layer in plan view. The second conductive layer 92 is provided on the second main surface 122 of the dielectric layer 120. The feeding portion 8 is a planar pattern formed on the second conductive layer 92.

The feeding portion 8 has a first feeding portion 5 and a second feeding portion 6. The first feeding portion 5 is electrically connected to the first region 3 of the first antenna element pattern 21 illustrated in FIG. 5 through a through-hole 124. The second feeding portion 6 is electrically connected to the second region 4 of the second antenna element pattern 22 illustrated in FIG. 5 through a through-hole 125. The through-hole 124, 125 is an example of the connecting portion 123 (see FIG. 4).

FIG. 6 illustrates a longitudinal direction Y1 of a range 76 in which multiple electronic components 73 are arranged. The longitudinal direction Y1 is substantially parallel to the arrangement direction of the multiple electronic components 73 arranged in a straight line. As described above, by arranging the electronic components 73 so that the longitudinal direction Y1 of the range 76 is along the second curved line 84 (see FIG. 1), excess stress generated in the portion along the curved region 82 can be suppressed.

One or more of the electronic components 73 illustrated in FIG. 6 may be components forming a matching circuit 71 for performing impedance matching. The matching circuit 71 performs impedance matching between the antenna element pattern 20 and the transmission line 70, for example.

Since the matching circuit 71 is connected between the antenna element pattern 20 and the first feeding portion 5, even if the area of the antenna element pattern 20 is reduced, deterioration in the antenna characteristics of the antenna 200 can be suppressed. That is, the antenna 200 can be miniaturized (i.e., made smaller) while retaining the antenna characteristics.

In this example, the matching circuit 71 has a section that is connected to the first feeding portion 5, a section that is connected to the first antenna element pattern 21 through the through-hole 124, and a section connected to the second antenna element pattern 22 through the through-hole 125. By doing so, a configuration is achieved in which the matching circuit 71 is connected between the antenna element pattern 20 and the first feeding portion 5.

Next, the simulation results of the antenna of the first embodiment will be described.

Figure 7:
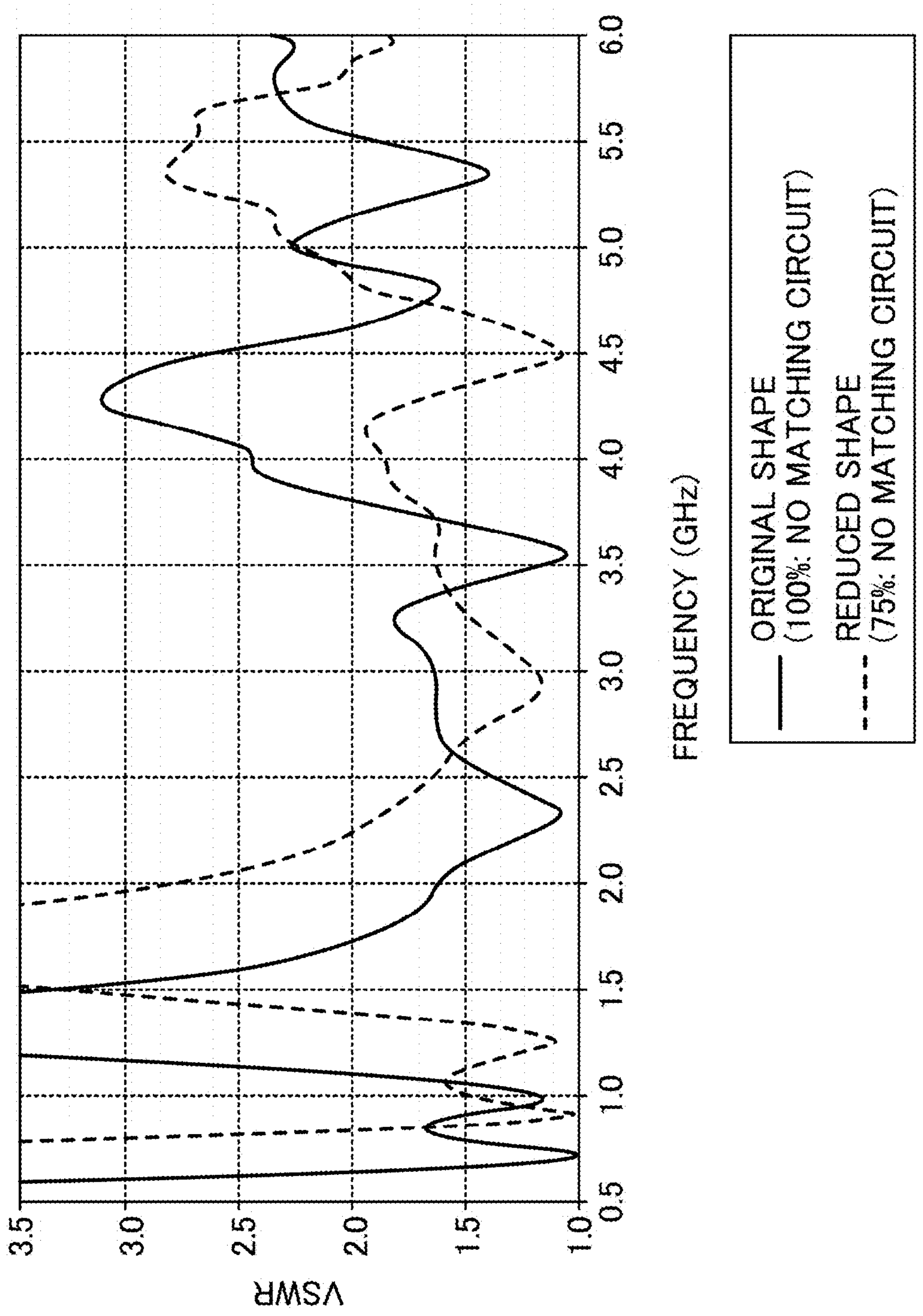
FIG. 7 illustrates an example of each simulation result of a planar antenna in the original shape and a planar antenna with a shape reduced in size to 75% of the original shape, wherein the shape of the planar antenna adapted to 600 MHz to 6 GHz without a matching circuit is the original shape (100%)

FIG. 7 is a diagram illustrating an example of each simulation result of the planar antenna in the original shape and the planar antenna of the shape reduced in size to 75% of the original shape, wherein the shape of the planar antenna adapted to 600 MHz to 6 GHz is the original shape (100%). VSWR represents the voltage standing wave ratio. VSWR is preferably 3.5 or less, and the closer the VSWR is to 1, the better the impedance matching. It is to be noted that frequency used differs depending on the geographical region or country, and in this example, the frequency band from 1 GHz to 1.7 GHz in the 600 MHz to 6 GHz range is defined as the unused frequency band. The VSWR in such an unused frequency band may exceed 3.5, for example.

In the case of the original shape, the VSWR was 3.5 or less in the bands from 600 MHz to 1 GHz and 1.7 GHz to 6 GHz, so based on this, impedance matching was achieved up to a relatively high frequency band, that is, up to approximately 6 GHz. However, in the case where the antenna 200 was reduced in size by the similarity ratio of 1:0.75, the VSWR waveform shifted to a higher frequency range as a whole, resulting in the emergence of a band in which the VSWR exceeded 3.5 in a low-frequency band of 1.9 GHz or less (excluding the above-mentioned unused frequency band). In other words, results were obtained indicating a deterioration in the antenna characteristics in the low-frequency band.

Figure 8:
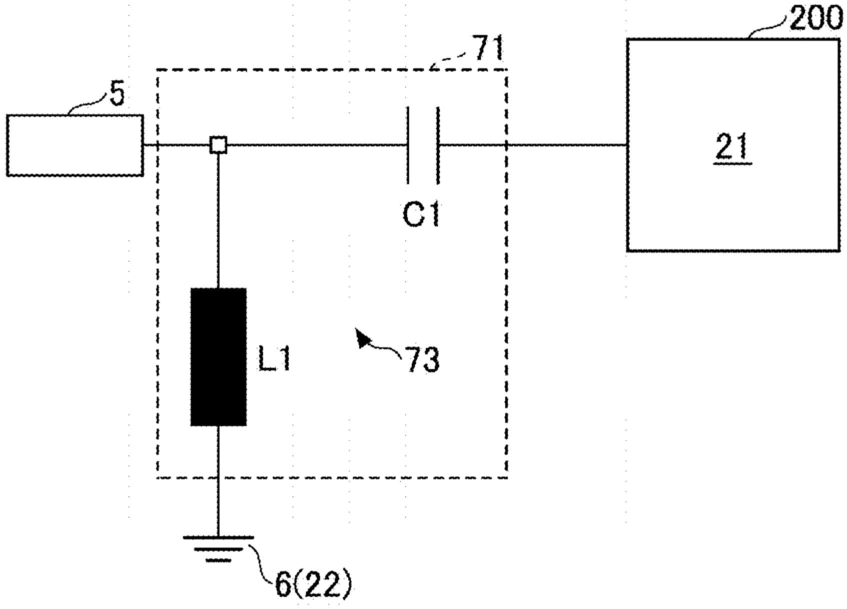
FIG. 8 is a diagram illustrating a matching circuit during a simulation.
Figure 9:
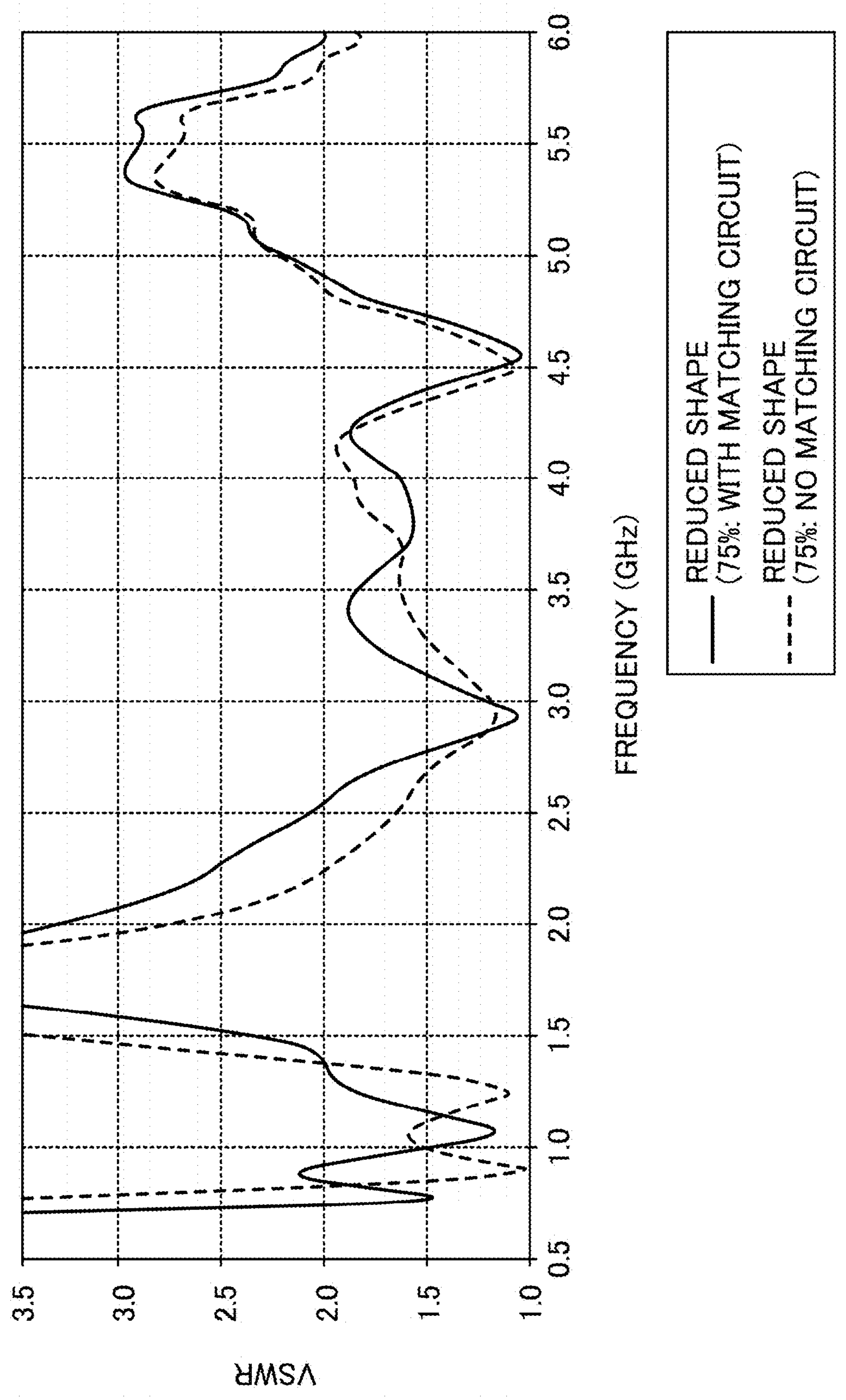
FIG. 9 is a diagram illustrating an example of a simulation results of the planar antenna with the matching circuit added.

FIG. 8 is a diagram illustrating an example of a matching circuit during a simulation. FIG. 9 is a diagram illustrating an example of simulation results obtained when the matching circuit 71 illustrated in FIG. 8 was added to the planar antenna (antenna 200) whose shape was reduced in size to 75%. As illustrated in FIG. 9, by adding the matching circuit 71, the bandwidth where the VSWR was 3.5 or less was expanded in the low-frequency band of 1.9 GHz or less. Thus, by adding the matching circuit 71, a result was achieved in which antenna 200 was miniaturized while retaining the antenna characteristics.

In the simulations illustrated in FIGS. 7 to 9, the conditions of each part were as follows:

<Planar Antenna of Original Shape (100%) (Without Matching Circuit)>

Maximum external dimension of the antenna element pattern 20 in the first direction: 40.0 mm Maximum external dimension of the antenna element pattern 20 in the second direction: 122.0 mm <Planar Antenna With a Shape Reduced in Size to 75% of the Original Shape (Without Matching Circuit)>

Maximum external dimension of the antenna element pattern 20 in the first direction: 30.0 mm Maximum external dimension of the antenna element pattern 20 in the second direction: 91.5 mm <Planar Antenna With a Shape Reduced in Size to 75% of the Original Shape (With Matching Circuit)>

Maximum external dimension of the antenna element pattern 20 in the first direction: 30.0 mm Maximum external dimension of the antenna element pattern 20 in the second direction: 91.5 mm <Matching Circuit 71>

Capacitor C1: 8.2 pF

Inductor L1: 8.2 nH

The matching circuit 71 is an example of a matching circuit that performs impedance matching between the antenna element pattern 20 and the transmission line (for example, the coaxial cable in which a signal line is electrically connected to the first feeding portion 5). Since the matching circuit 71 is electrically connected to the antenna element pattern 20, even if the area of the antenna element pattern 20 is reduced, deterioration in antenna characteristics of the planar antenna according to each embodiment of the present disclosure can be suppressed. That is, miniaturization of the planar element according to each embodiment of the present disclosure and retention of the antenna characteristics are achieved.

The matching circuit 71 illustrated in FIG. 8 includes multiple electronic components 73. Since the multiple electronic components 73 include at least two types of components among a resistor, a capacitor, and an inductor, impedance matching by the matching circuit 71 can be achieved. At least one of the multiple electronic components 73 is electrically connected between the antenna element pattern 20 and the first feeding portion 5.

Figure 10:
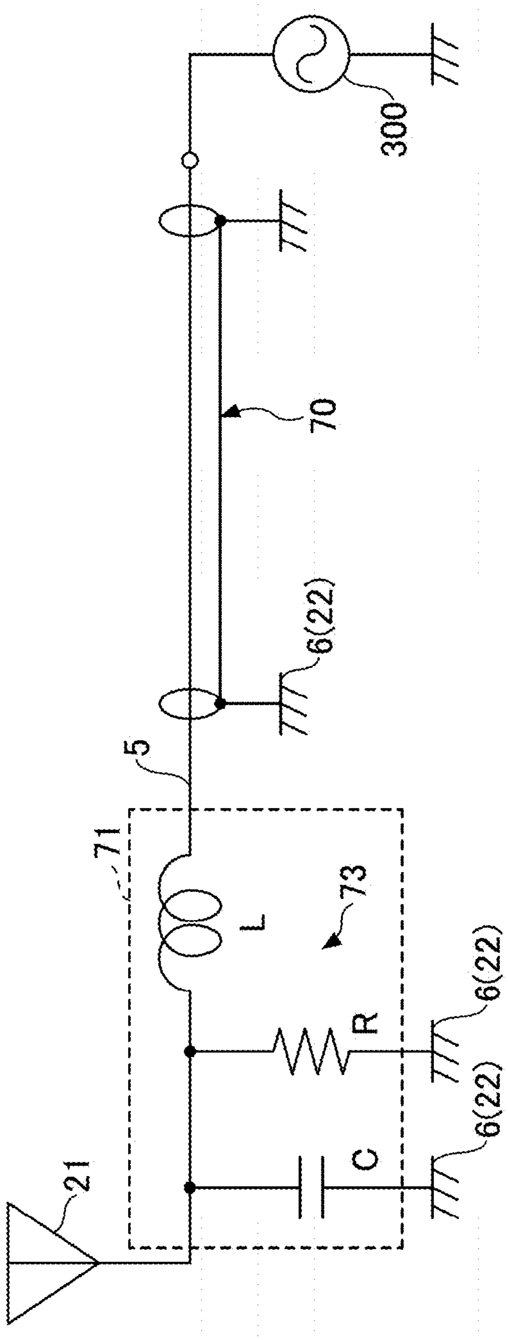
FIG. 10 is a diagram illustrating an example of a matching circuit according to the first embodiment.

FIG. 10 is a diagram illustrating an example of a matching circuit according to the first embodiment. The matching circuit 71 illustrated in FIG. 10 is formed by the multiple electronic components 73 including two or three types of components among the resistor R, the capacitor C, and the inductors L. At least one type of the resistor R, the capacitor C, and the inductor L may be realized in a form different from the electronic components 73 (for example, the electrical characteristics of the wiring itself).

The inductor L is connected between the first feeding portion 5 and the first antenna element pattern 21. The capacitor C and the resistor R are connected between the signal line that is between the first antenna element pattern 21 and the inductor L and the second feeding portion 6 grounded by ground line of the transmission line 70. The resistor R functions as a detection resistor for a device 300 configured to detect a disconnection within the planar antenna or a disconnection between the planar antenna and the device 300.

The transmission line 70 is, for example, a coaxial cable. An internal conductor (signal line) at one end of the coaxial cable is electrically connected to the first feeding portion 5, and an external conductor (ground line) at one end of the coaxial cable is electrically connected to the second feeding portion 6. To the other end of the coaxial cable, for example, a device having either or both of a transmitting function and a receiving function is connected.

Figure 11:
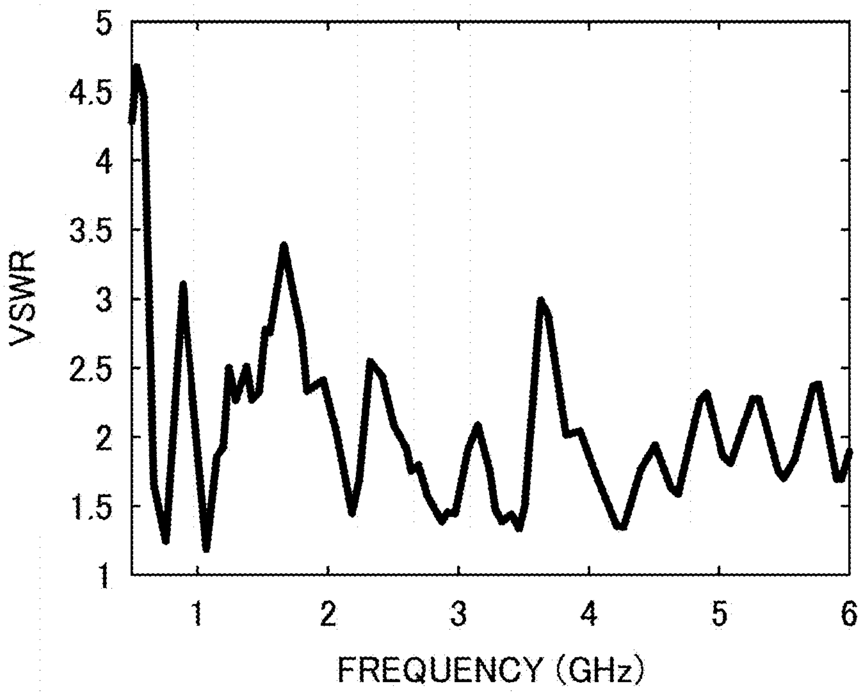
FIG. 11 is a diagram illustrating an example of measurement results of the VSWR of the vehicle-type antenna device according to the first embodiment, mounted on an actual vehicle.

FIG. 11 is a diagram illustrating an example of actual measurement results of the VSWR of the vehicle-type antenna device of the first embodiment, mounted on an actual vehicle. FIG. 11 indicates the results of measuring the VSWR using a network analyzer in a state where the antenna module 400 having the antenna 200 with the matching circuit 71 (FIG. 10) was attached to the upper part of the front passenger side of the windshield of a right-hand-drive vehicle as illustrated in FIG. 1. The results indicate that an excellent characteristic of 3.5 or less VSWR was obtained in the range of 600 MHz to 6 GHz in the case where the device was mounted on an actual vehicle.

During the actual measurement in FIG. 11, the conditions of each part were as follows:

<Antenna 200 With Matching Circuit 71 (FIG. 10)>

Maximum external dimension of the antenna 200 in the first direction: 28.0 mm Maximum external dimension of antenna 200 in the second direction: 110.0 mm <Matching Circuit 71 (FIG. 10)>

Capacitor C: 2 pF

Inductor L: 10 nH

Resistance R: 10 kΩ

Each of the resistor R, the capacitor C and the inductor L is a chip component having a higher rigidity than both the dielectric layer 120 and the conductive layer 74 included in the antenna element pattern 20 arranged along the curved surface of the glass plate 80. The resistor R, the capacitor C and the inductor L were 10 kΩ, 2 pF, and 10 nH, respectively. The dielectric layer 120 was a glass epoxy substrate (nominal thickness: 0.1 mm) provided with the first conductive layer 91 and the second conductive layer 92. Further, the arrangement direction (longitudinal direction Y1 of the range 76 in which the electronic components 73 are arranged. See FIG. 6) of the capacitor C1 and the inductor L1 was set to be the transverse direction of the curved region 82, and the radius of curvature in the transverse direction of the curved region 82 was set to be about 2,500 mm. Further, the longitudinal direction of the curved region 82 was set to be a direction substantially perpendicular to the transverse direction of the curved region 82, and the radius of curvature of the curved region 82 in the longitudinal direction was set to be larger than the radius of curvature of the curved region 82 in the transverse direction. Thus, stress exerted on a portion along the curved region 82 (such as a chip components and so on constituting the matching circuit 71) was alleviated.

Figure 12:
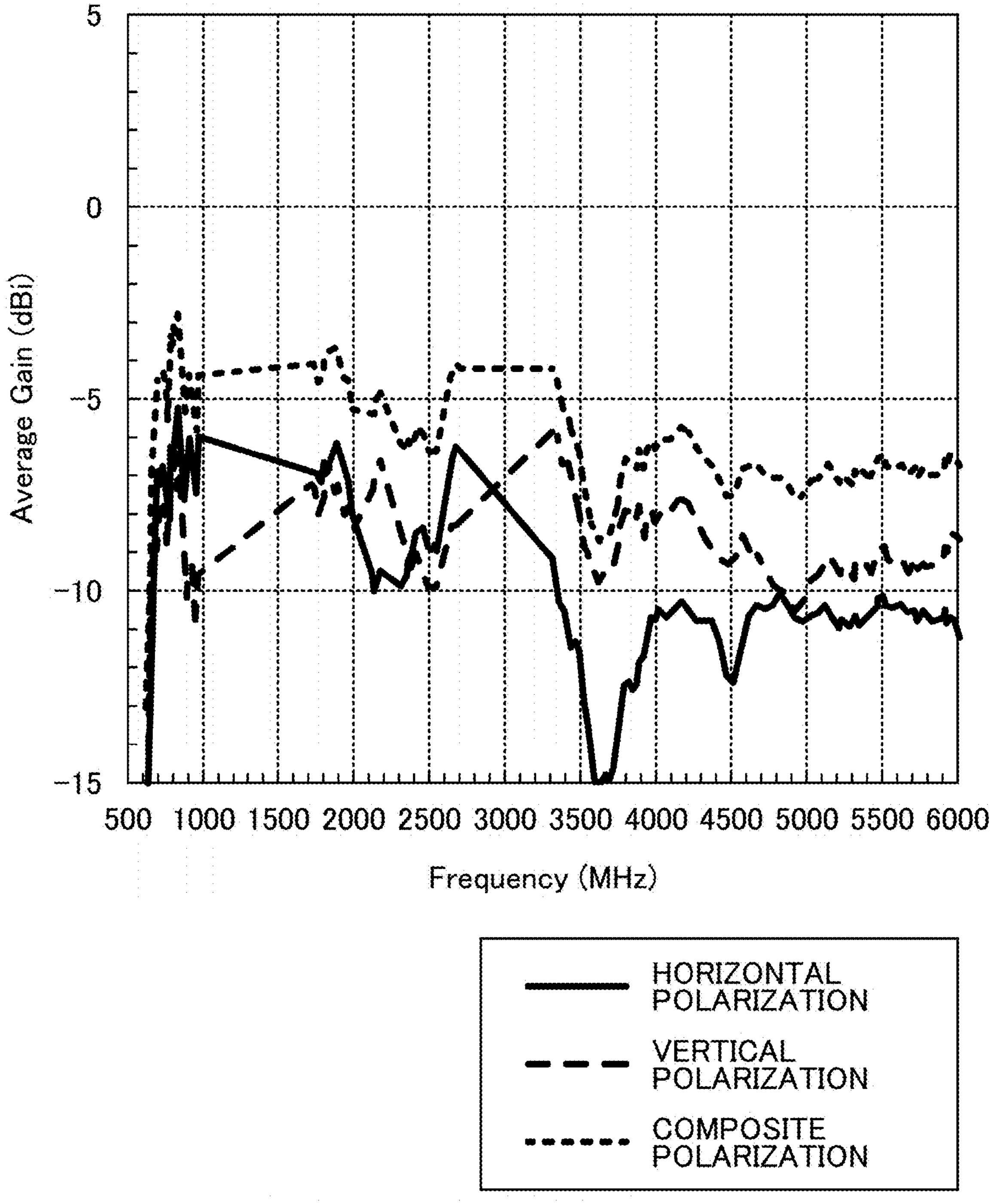
FIG. 12 is a diagram illustrating an example of actual measurement results of the antenna gain of the vehicle-type antenna device according to the first embodiment, mounted on an actual vehicle.

FIG. 12 is a diagram illustrating an example of the actual measurement results of the antenna gain of the vehicle-type antenna device of the first embodiment, mounted on an actual vehicle. FIG. 12 indicates the results of measuring the antenna gain in a state where the antenna module 400 having the antenna 200 with the matching circuit 71 (FIG. 10) was attached to the upper part of the front passenger seat side of the windshield of the right-hand-drive vehicle as illustrated FIG. 1. The antenna gain illustrated on the vertical axis of FIG. 12 represents the average value (the average value of all antenna gains actually measured at each azimuth angle from 0° to 358°) at each elevation angle from 0° (horizontal plane) to 30°. According to FIG. 12, a good antenna gain of an average antenna gain of −5.5 dBi was obtained for the composite polarization in the range of from 617 MHz to 6 GHz.

The conditions of each part during the actual measurement in FIG. 12 were the same as those described above in FIG. 11.

Second Embodiment

Next, a second embodiment is described. In the second embodiment, a description on configurations, operations, and effects substantially the same as in the first embodiment is omitted by referring to the aforementioned description.

Figure 13:
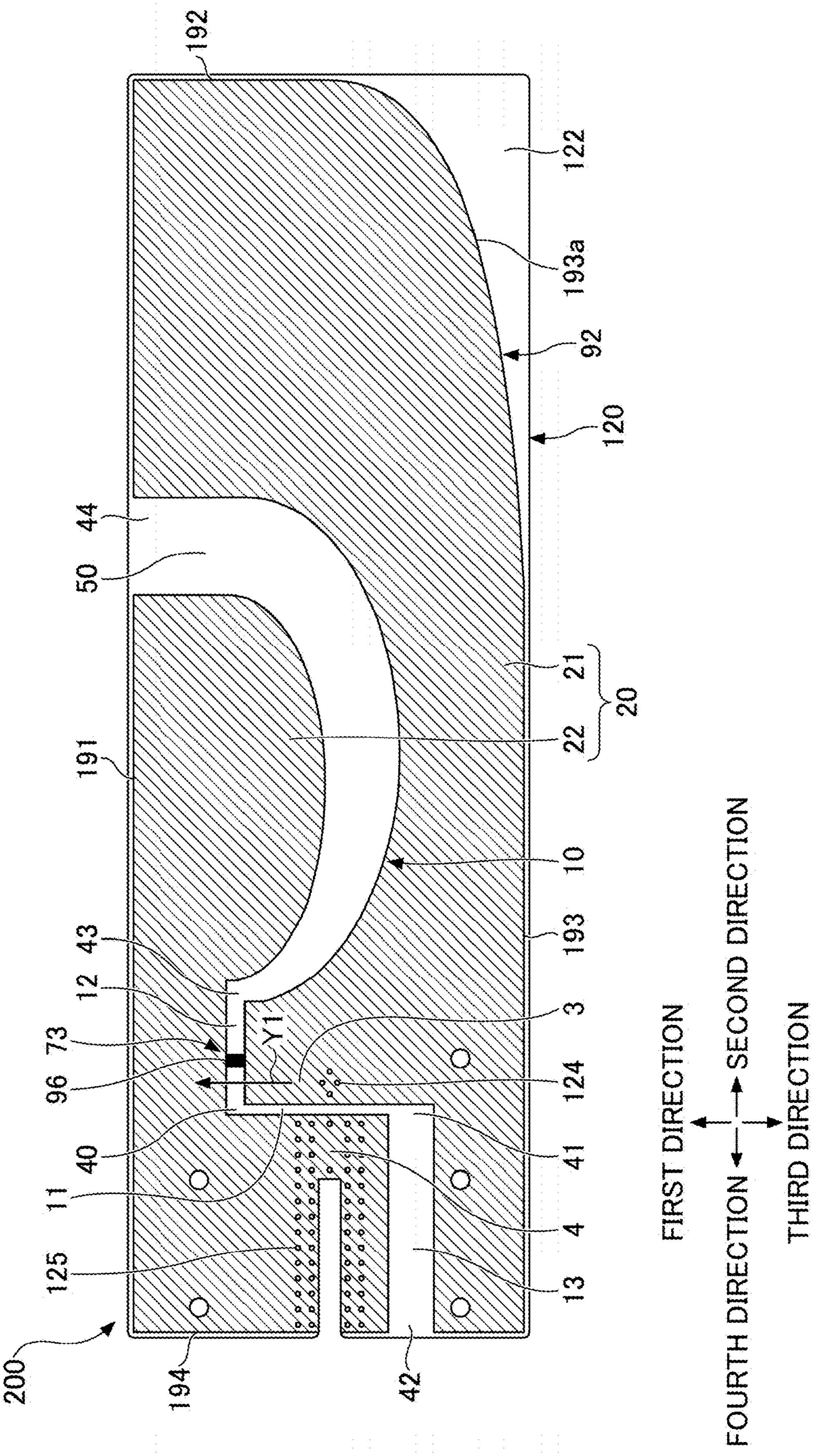
FIG. 13 is a diagram illustrating an example of a vehicle-type antenna device according to a second embodiment.

FIG. 13 is a diagram illustrating an example of a planar pattern formed on the second conductive layer of the vehicle-type antenna device according to the second embodiment, in plan view. The antenna element pattern 20 (FIG. 5) according to the first embodiment is formed on the first conductive layer 91 (FIG. 4) provided on the first main surface 121 of the dielectric layer 120. In contrast, the antenna element pattern 20 (FIG. 13) according to the second embodiment is formed on the second conductive layer 92 (FIG. 4) provided on the second main surface 122 of the dielectric layer 120. The laminated structure of the vehicle-type antenna device according to the second embodiment may be the same as that of FIG. 4.

In the second embodiment, an antenna element pattern having the same shape as the antenna element pattern 20 formed on the second conductive layer 92 may be formed on the first conductive layer 91 so that the antenna element pattern 20 formed on the second conductive layer 92 coincides with the antenna element pattern in plan view. That is, the antenna element pattern 20 may be formed on both the first conductive layer 91 and the second conductive layer 92.

The vehicle-type antenna device according to the second embodiment includes a single electronic component 73 instead of a matching circuit formed by multiple electronic components 73. FIG. 13 illustrates, as a single electronic component 73, a resistor 96 for detecting whether the antenna 200 is connected to an external device connected to the transmission line 70. The resistor 96 is a chip component placed on the second conductive layer 92 so as to straddle the slot 12. One end of the resistor 96 is electrically connected to the first antenna element pattern 21 formed on the second conductive layer 92, and the other end is electrically connected to the second antenna element pattern 22 formed on the second conductive layer 92. By disposing the resistor 96 so that the longitudinal direction Y1 of the resistor 96 is along the second curved line 84 (see FIG. 1), excess stress generated in a portion along the curved region 82 can be suppressed.

Figure 14:
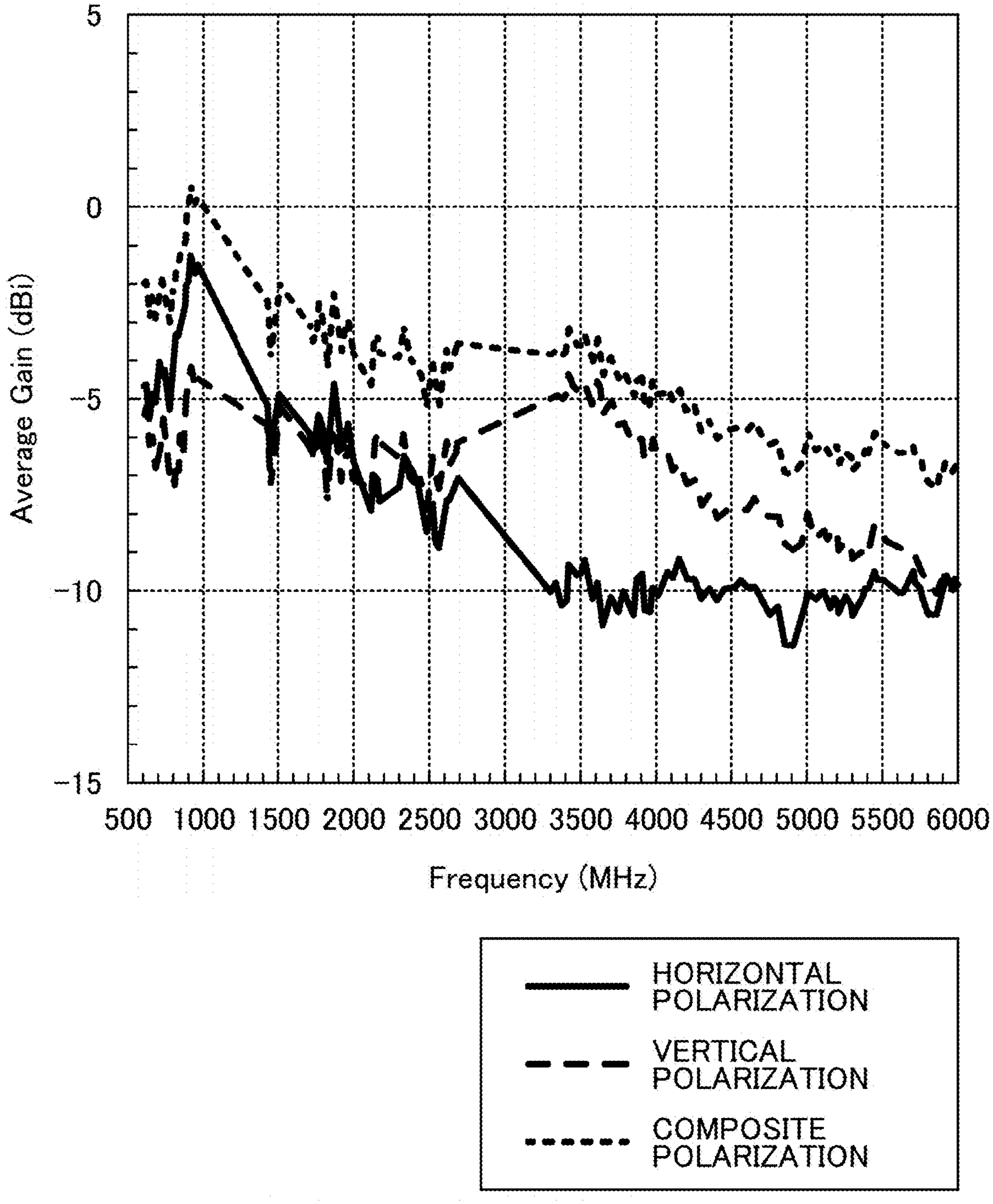
FIG. 14 is a diagram illustrating an example of actual measurement results of the antenna gain of a vehicle-type antenna device according to the second embodiment, mounted on an actual vehicle.

FIG. 14 is a diagram illustrating an example of actual measurement results of the antenna gain of the vehicle-type antenna device according to the second embodiment, mounted on an actual vehicle. The actual measurement conditions such as the actual measurement environment in FIG. 14 are the same as those in FIG. 12 except for the conditions of the following parts. According to FIG. 14, a good antenna gain of an average antenna gain of −3.5 dBi was obtained in the composite polarization, especially in the range of 617 MHz to 2.5 GHz.

The conditions of the actual measurement parts in FIG. 14 are as follows:

Antenna element pattern 20: formed on both the first conductive layer 91 and the second conductive layer 92

Maximum external dimension of antenna 200 in the first direction: 40.0 mm

Maximum external dimension of antenna 200 in the second direction: 125.0 mm

Resistance 96:10 kΩ chip parts (1608 shapes)

Dielectric layer 120: glass epoxy substrate (nominal thickness: 0.2 mm)

Adhesive layer 79: acrylic foam tape

Third Embodiment

Next, a third embodiment is described. In the third embodiment, a description on configurations, operations, and effects substantially the same as in the first embodiment and the second embodiment is omitted by referring to the aforementioned description.

Figure 15:
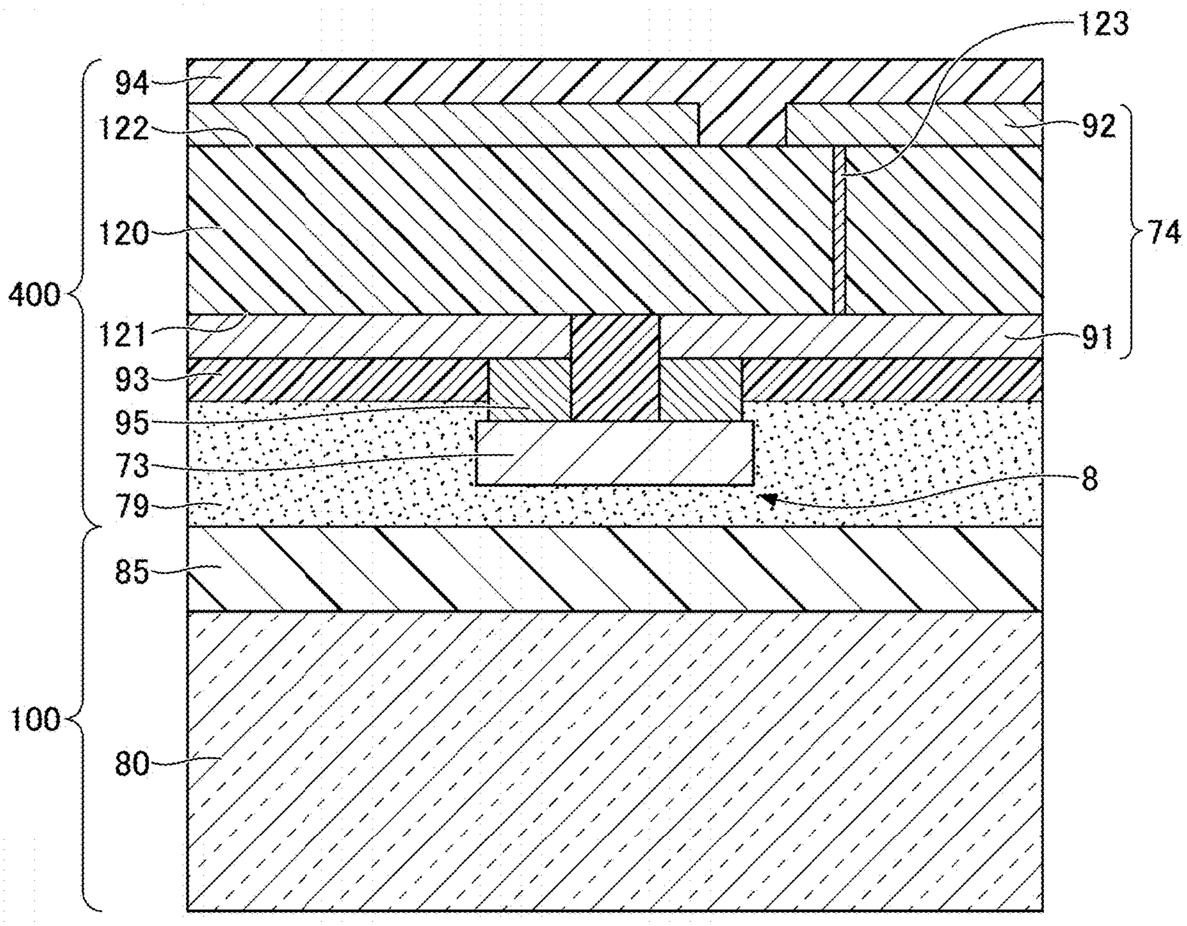
FIG. 15 is a cross-sectional view for describing an example of the laminated structure of a vehicle-type antenna device according to a third embodiment.

FIG. 15 is a cross-sectional view for describing an example of the laminated structure of the vehicle-type antenna device according to the third embodiment. The feeding portion 8 and the electronic component 73 (FIG. 4) according to the first and second embodiments are arranged on the second conductive layer 92 and electrically connected to the second conductive layer 92 by solder 95 or the like. In contrast, the feeding portion 8 and the electronic component 73 according to the third embodiment are arranged under the first conductive layer 91 and electrically connected to the first conductive layer 91 by solder 95 or the like. The antenna element pattern according to the third embodiment is formed on the second conductive layer 92 and may be the same as the antenna element pattern 20 illustrated in FIG. 13.

In the third embodiment (FIG. 15), an antenna element pattern having the same shape as the antenna element pattern formed on the second conductive layer 92 may be formed on the first conductive layer 91 so that the antenna element pattern formed on the second conductive layer 92 coincides with the antenna element pattern in plan view. That is, the antenna element pattern may be formed on both the first conductive layer 91 and the second conductive layer 92.

As in the second embodiment, the vehicle-type antenna device according to the third embodiment includes one electronic component 73 instead of a matching circuit formed of a plurality of electronic components 73. The electronic component 73 may be a resistor 96 as in the second embodiment. In the third embodiment, the resistor 96 is a chip component disposed under the first conductive layer 91. The resistor 96 may be disposed so as to straddle the slot 12 of the antenna element pattern 20 formed in the first conductive layer 91 or the second conductive layer 92 in plan view. The resistor 96 has one end electrically connected to the first antenna element pattern 21 formed in the first conductive layer 91 and the other end electrically connected to the second antenna element pattern 22 formed in the first conductive layer 91. By disposing the resistor 96 so that the longitudinal direction Y1 of the resistor 96 is along the second curved line 84 (see FIG. 1), excess stress generated in the portion along the curved region 82 can be suppressed.

Figure 16:
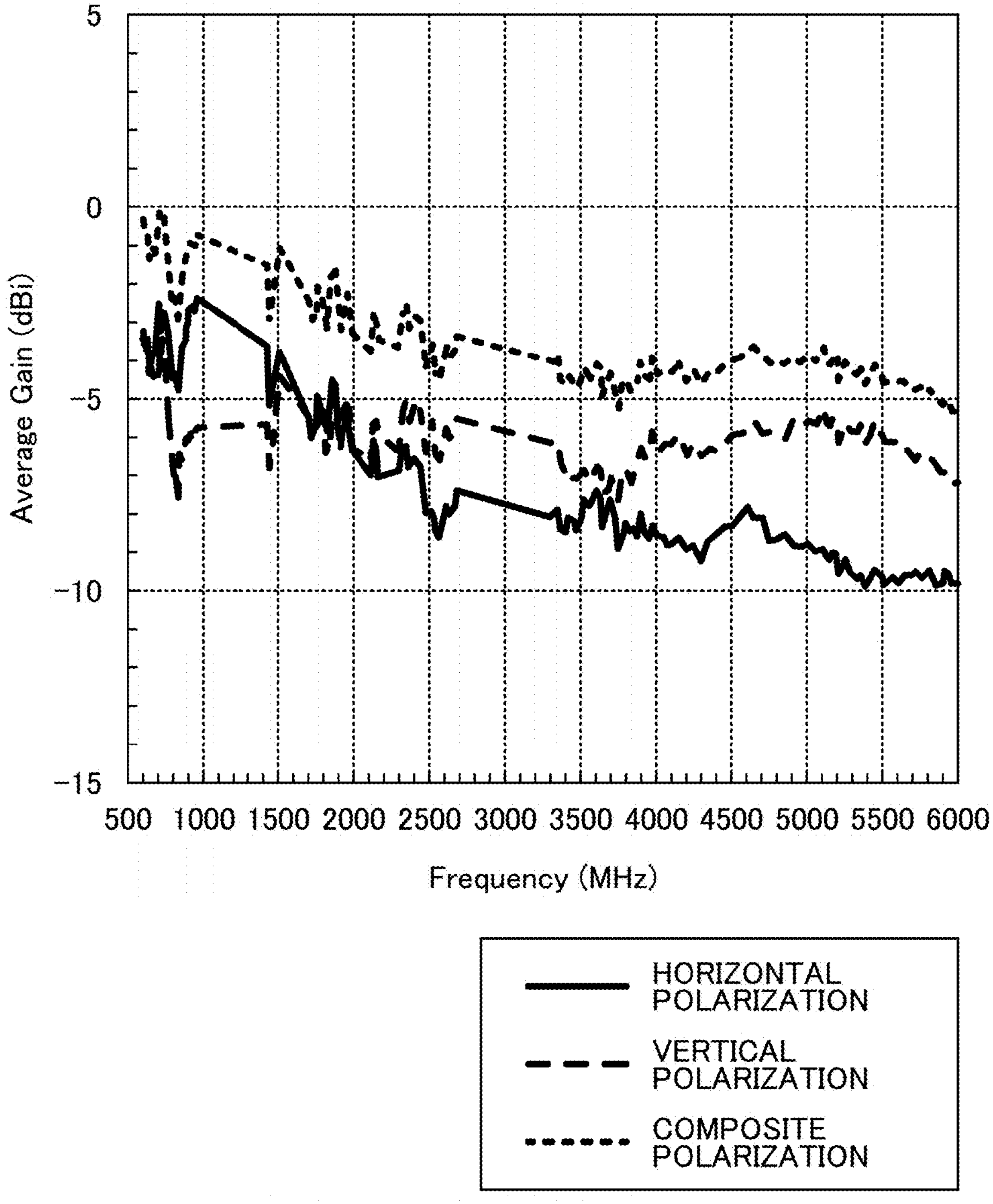
FIG. 16 is a diagram illustrating an example of the measured antenna gain of the vehicle-type antenna device according to the third embodiment, mounted on an actual vehicle.

FIG. 16 is a diagram illustrating an example of an actual measurement result of the antenna gain of the vehicle-type antenna device according to the third embodiment mounted on an actual vehicle. The actual measurement conditions such as the actual measurement environment in FIG. 16 are the same as those in FIGS. 12 and 14, except for the conditions of the following parts. According to FIG. 16, a good antenna gain of an average antenna gain of −2.9 dBi was obtained in the composite polarization in the range of 617 MHz to 6.0 GHz.

The actual measurement conditions in FIG. 16 were as follows:

- Antenna element pattern 20: formed on the second conductive layer 92
- Maximum external dimension of antenna 200 in the first direction: 40.0 mm
- Maximum external dimension of antenna 200 in the second direction: 125.0 mm
- Resistance 96:10 kΩ chip component (1608 shapes)
- Dielectric layer 120: Glass epoxy substrate (nominal thickness: 0.1 mm)
- Adhesive layer 79: Polyethylene foam with double-sided tape on the front and back surfaces
- Thickness of polyethylene foam: 5 mm
- Apparent density of polyethylene foam: 45 kg/m$^3$
- Transmission line 70: Coaxial cable The transmission line 70 (coaxial cable) and the electronic component 73 (resistor 96) are arranged by embedding a part of polyethylene foam in a cut-out part. Thereby, as illustrated in FIG. 15, the transmission line 70 (coaxial cable) and the electronic component 73 (resistor 96) do not protrude from the adhesive layer 79 (polyethylene foam) toward the surface of the window glass 100, so that the attachment to the window glass 100 is stabilized.

Summary of Actual Measurement Results

The antenna device of the actual measurement example of the first embodiment is small due to the matching circuit. However, as illustrated in FIG. 12, a good antenna gain was obtained when the device was mounted on an actual vehicle. The antenna device of the actual measurement example of second embodiment is larger than that of the antenna device of the actual measurement example of the first embodiment because the antenna device of the actual measurement example of second embodiment has a detection resistance but no matching circuit. However, as illustrated in FIG. 14, a result was obtained that the antenna gain in the composite polarized wave was improved in the low frequency band. In the actual measurement example of the third embodiment, as illustrated in FIG. 16, a result was obtained that the antenna gain in the composite polarized wave was improved not only in the low frequency band but also in the high frequency band.

In the actual measurement example of the third embodiment, a polyethylene foam having a thickness of 5 mm and an apparent density of 45 kg/m$^3$ was used. However, the apparent density of the polyethylene foam may be 15 kg/m$^3$ or more and 150 kg/m$^3$ or less, and can be appropriately selected in consideration of the curved shape of the mounted glass surface and the conformability to the curved surface of the mounted dielectric substrate. The polyethylene foam is preferably an independently foamed foam that does not retain much moisture, and may be an acrylic foam.

The thickness of the adhesive layer 79 (FIG. 15) of the antenna device of the measured example of the third embodiment is sufficiently larger than the thickness of the adhesive layer 79 (FIG. 4) of the antenna device of the measured example of the second embodiment. Therefore, in the antenna device of the measured example of the third embodiment, the distance between the antenna element pattern 20 and the glass plate 80 is longer than that of the antenna device of the measured example of the second embodiment. As a result, in the measured example of the third embodiment (FIG. 16), compared with the measured example of the second embodiment (FIG. 14), the antenna gain in a high frequency band of 4 GHz or more is improved. In the low frequency band, when the antenna element pattern 20 is close to the glass plate 80 which is a dielectric, the relative permittivity of the dielectric gives an effect of shortening the wavelength, which is expected to contribute to miniaturization of the antenna device. However, in the high frequency band, when the antenna element pattern 20 is close to the glass plate 80 which is a dielectric, the propagation of the radio wave from the antenna element pattern 20 into the glass plate 80 increases, and the degree of contribution of the radio wave to the outside of the vehicle decreases.

Although the embodiment has been described above, the technique of the present disclosure is not limited to the above embodiment. Various modifications and improvements such as combination with or replacement of some or all of the other embodiments are possible.

For example, the planar antenna may be part or all of a plurality of antennas included in a diversity antenna or a MIMO (Multiple-Input and Multiple-Output) antenna. This improves communication quality.

What is claimed is:

1. A vehicle-type antenna device, comprising:
a dielectric plate for a vehicle; and
an antenna attached to the dielectric plate;
wherein the antenna includes:
a dielectric layer disposed along a curved surface of the dielectric plate,
a conductive layer laminated on the dielectric layer and having a planar pattern formed thereon,
a feeding portion electrically connected to the planar pattern, and
an electronic component electrically connected to the conductive layer and having a higher rigidity than a combined rigidity of the dielectric layer and the conductive layer,
wherein a curved region of the dielectric plate is defined as an extent to which the dielectric layer is attached to the curved surface includes a first curved line having a smallest radius of curvature in the curved region and a second curved line intersecting the first curved line and having a radius of curvature larger than that of the first curved line, and
a longitudinal direction of an extent of the dielectric plate to which the electronic component is disposed is a direction along the second curved line, the extent being a range.

2. The vehicle-type antenna device according to claim 1, wherein said electronic component disposed in the range is a plurality of electronic components arranged in the range.

3. The vehicle-type antenna device according to claim 2, wherein the plurality of electronic components includes at least two types of electronic components among a resistor, a capacitor, and an inductor.

4. The vehicle-type antenna device according to claim 1, wherein a radius of curvature in the feeding portion is larger than a radius of curvature in the range.

5. The vehicle-type antenna device according to claim 1, wherein the curved region has a dimension in which a length in a direction along the first curved line is longer than a length in a direction along the second curved line.

6. The vehicle-type antenna device according to claim 1, wherein
the dielectric layer has a first main surface and a second main surface opposite to the first main surface, and wherein the conductive layer includes a first conductive layer provided on the first main surface and a second conductive layer provided on the second main surface, and
the antenna includes a connecting portion for electrically connecting the first conductive layer and the second conductive layer in a thickness direction of the dielectric layer.

7. The vehicle-type antenna device according to claim 6, wherein
the first conductive layer is disposed on a side of the dielectric layer where the dielectric plate is,
the second conductive layer is arranged on an opposite side of the dielectric layer from the dielectric plate,
the planar pattern includes an antenna element pattern formed on the first conductive layer or the second conductive layer, and
the feeding portion and the electronic component are arranged over or under the second conductive layer.

8. The vehicle-type antenna device according to claim 1, wherein the electronic component disposed in the range is one in number.

9. The vehicle-type antenna according to claim 1, wherein the electronic component disposed in the range includes a resistor.

10. The vehicle-type antenna device according to claim 1, wherein the radius of curvature of the first curved line is 1,500 mm or more.

11. The vehicle-type antenna device according to claim 1, wherein the curved region falls within a rectangular-shaped having a short side thereof that is 50 mm or less in length in plan view.

12. The vehicle-type antenna device according to claim 1, wherein
the feeding portion has a first feeding portion and a second feeding portion,
the planar pattern includes an antenna element pattern having a first antenna element pattern connected to the first feeding portion and has a second antenna element pattern connected to the second feeding portion to be grounded, and
the electronic component forms a matching circuit configured to perform impedance matching.

13. The vehicle-type antenna device according to claim 12, wherein
the matching circuit includes a plurality of said electronic components, and
at least one of the plurality of said electronic components is connected between the antenna element pattern and the first feeding portion.

14. The vehicle-type antenna device according to claim 1, wherein
the antenna has an adhesive layer bonded to the dielectric plate, and
the adhesive layer has a thickness of 0.2 mm or more.

15. The vehicle-type antenna device according to claim 1, further comprising an antenna module that includes a transmission line, wherein the antenna is an antenna included in the antenna module, and
the transmission line is electrically connected to the feeding portion.

16. The vehicle-type antenna device according to claim 15, wherein the dielectric layer is a region having a short side that intersects the transmission line in plan view and a long side that is longer than the short side.

17. The vehicle-type antenna device according to claim 15, wherein the antenna module has a fixing part configured to fix the transmission line to the dielectric plate.

18. The vehicle-type antenna device according to claim 17, wherein the transmission line is connected to the feeding portion by being bent in a direction different from a direction in which the transmission line extends in the fixing part.

19. The vehicle-type antenna device according to claim 1, wherein the dielectric plate is a glass plate.

20. The vehicle-type antenna device according to claim 1, wherein the antenna transmits or receives radio waves in at least a portion of a frequency band in a range of from 600 MHz to 6 GHz, inclusive.

* * * * *